US012736636B2

(12) United States Patent
Hatakeyama et al.

(10) Patent No.: US 12,736,636 B2

(45) Date of Patent: Sep. 15, 2026

(54) RANGE IMAGING DEVICE AND RANGE IMAGING METHOD

(71) Applicant: TOPPAN Inc., Tokyo (JP)

(72) Inventors: Kunihiro Hatakeyama, Taito-ku (JP); Satoshi Takahashi, Taito-ku (JP)

(73) Assignee: TOPPAN Inc., Tokyo (JP)

( * ) Notice: Subject to any disclaimer, the term of this patent is extended or adjusted under 35 U.S.C. 154(b) by 653 days.

(21) Appl. No.: 18/356,267

(22) Filed: Jul. 21, 2023

(65) Prior Publication Data

US 2023/0366990 A1 Nov. 16, 2023

Related U.S. Application Data

(63) Continuation of application No. PCT/JP2022/002037, filed on Jan. 20, 2022.

(30) Foreign Application Priority Data

Jan. 22, 2021 (JP) ................................ 2021-008799

(51) Int. Cl.

*G01S 7/4861* (2020.01)
*G01S 7/4865* (2020.01)
*G01S 17/894* (2020.01)

(52) U.S. Cl.

CPC .......... *G01S 7/4861* (2013.01); *G01S 7/4865* (2013.01); *G01S 17/894* (2020.01)

(58) Field of Classification Search

CPC ................................ G01S 17/89; G01S 17/10
See application file for complete search history.

(56) References Cited

U.S. PATENT DOCUMENTS

2018/0045513 A1* 2/2018 Kitamura ................ G01C 3/06

FOREIGN PATENT DOCUMENTS

| | | | |
|---|---|---|---|
| CN | 110703226 A * | 1/2020 | .......... G01S 7/4861 |
| JP | 2004-294420 A | 10/2004 | |
| JP | 2012-185171 A | 9/2012 | |

OTHER PUBLICATIONS

International Search Report issued Mar. 1, 2022 in PCT/JP2022/002037, filed Jan. 20, 2022, 5 pages.

* cited by examiner

*Primary Examiner* — Yuqing Xiao
*Assistant Examiner* — Chia-Ling Chen
(74) *Attorney, Agent, or Firm* — Oblon, McClelland, Maier & Neustadt, L.L.P.

(57) ABSTRACT

A range imaging device includes a light-receiving unit including at least one pixel circuit including a photoelectric conversion element that generates charge in response to incident light, N (N≥3) charge storage units that integrate charge in a frame cycle, and transfer transistors, and a pixel drive circuit that causes the transfer transistors to distribute charge to the charge storage units with integration timing synchronizing with light pulses, a light source unit that emits light pulses; a range image processing unit that calculates a distance to an object based on integrated charges, and a measurement control unit that calculates a thinning time of not integrating charge, according to integrated charge in the charge storage units, the distance, and intensity of the incident light. The measurement control unit controls integration of charge with a thinning time set in a measurement zone corresponding to the distance from the light-receiving unit.

21 Claims, 11 Drawing Sheets

FIG.4
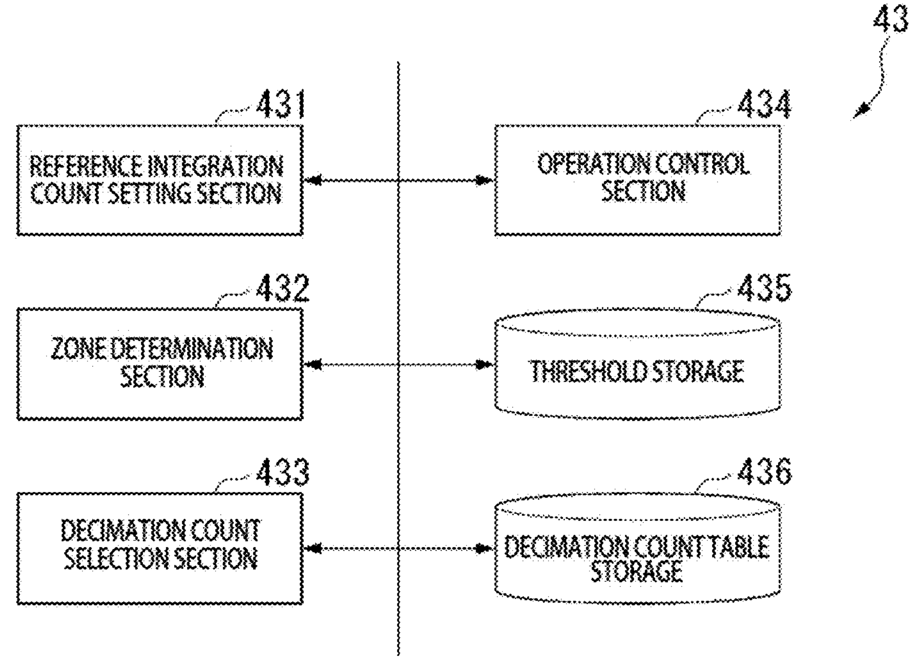
FIG.5
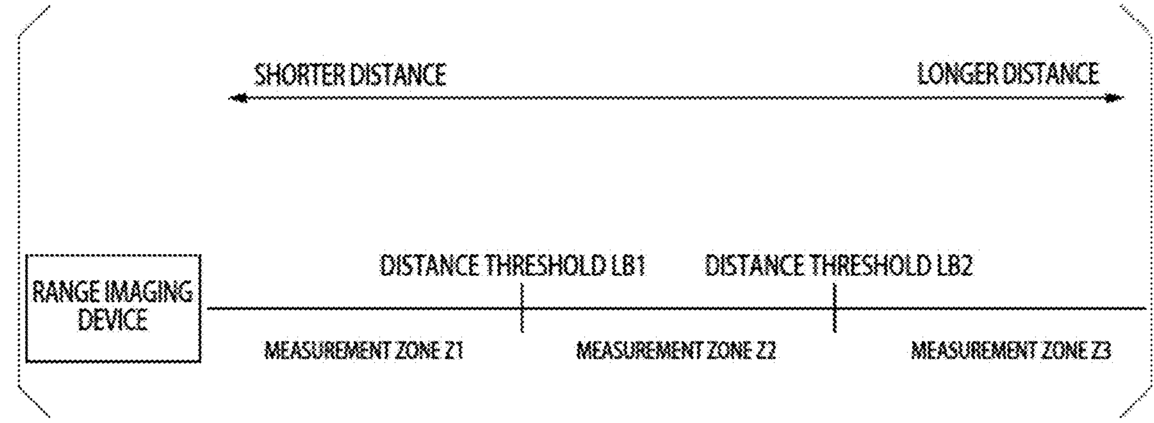
FIG.6A
MEASUREMENT ZONE Z1
| EXTERNAL LIGHT INTENSITY | | |
|---|---|---|
| Lux | EXTERNAL LIGHT SIGNAL LEVEL | DECIMATION COUNT |
| 100,000 Lux | 3000 LSB | 1500 |
| 30,000 Lux | 1000 LSB | 1000 |
| 10,000 Lux | 300 LSB | 500 |
| NO EXTERNAL LIGHT | 0 LSB | 0 |

FIG.6B

MEASUREMENT ZONE Z2

| EXTERNAL LIGHT INTENSITY | | |
|---|---|---|
| Lux | EXTERNAL LIGHT SIGNAL LEVEL | DECIMATION COUNT |
| 100,000 Lux | 3000 LSB | XXXXX |
| 30,000 Lux | 1000 LSB | XXXXX |
| 10,000 Lux | 300 LSB | XXXXX |
| NO EXTERNAL LIGHT | 0 LSB | XXXXX |

FIG.6C

MEASUREMENT ZONE Z3

| EXTERNAL LIGHT INTENSITY | | |
|---|---|---|
| Lux | EXTERNAL LIGHT SIGNAL LEVEL | DECIMATION COUNT |
| 100,000 Lux | 3000 LSB | XXXXX |
| 30,000 Lux | 1000 LSB | XXXXX |
| 10,000 Lux | 300 LSB | XXXXX |
| NO EXTERNAL LIGHT | 0 LSB | XXXXX |

RANGE IMAGING DEVICE AND RANGE IMAGING METHOD

CROSS-REFERENCE TO RELATED APPLICATIONS

The present application is a continuation of and claims the benefit of priority to International Application No. PCT/JP2022/002037, filed Jan. 20, 2022, which is based upon and claims the benefit of priority to Japanese Application No. 2021-008799, filed Jan. 22, 2021. The entire contents of these applications are incorporated herein by reference.

BACKGROUND OF THE INVENTION

Field of the Invention

The present invention relates to range imaging devices and range imaging methods.

Description of Background Art

JP 2004-294420 A describes a time of flight (hereinafter referred to as TOF) type range imaging device which measures the distance to an object based on the time of flight of light, using the known speed of light. JP 2012-185171 A describes a range imaging device. The entire contents of these publications are incorporated herein by reference.

SUMMARY OF THE INVENTION

According to one aspect of the present invention, a range imaging device includes a light source that emits light pulses to a measurement space, a light-receiving unit including a pixel drive circuit and at least one pixel circuit including a photoelectric conversion element, charge storage units, and transfer transistors, a range image processing unit including circuitry that calculates, based on charge integrated in each of the charge storage units, a distance from the light-receiving unit to an object in the measurement space as a measurement distance, and a measurement control unit including circuitry that calculates a thinning time according to integrated charge in the charge storage units, the distance, and intensity of incident light. The photoelectric conversion element generates the charge according to the incident light incident from the measurement space targeted for measurement, the charge storage units have N charge storage units where N≥3 and integrate the charge in a frame cycle, the transfer transistors transfer the charge to the charge storage units from the photoelectric conversion element, the pixel drive circuit turns on or off the transfer transistors for the charge storage units at predetermined integration timing synchronizing with emission of light pulses to distribute and integrate the charge, the thinning time is the number of times thinning processing is performed in which the charge in the charge storage units is not integrated, in terms of an integration time that is the number of times integration of integrating the charge is performed, and the circuitry of the measurement control unit determines a measurement zone, to which the measurement distance belongs, from among measurement zones which are established according to zone thresholds set according to multiple distances from the light-receiving unit, and control integration of the charge in the charge storage units according to the thinning time set in the measurement zone as determined.

According to another aspect of the present invention, a range imaging device includes a light source that emits light pulses to a measurement space, a light-receiving unit including a pixel drive circuit and at least one pixel circuit including a photoelectric conversion element, charge storage units, and transfer transistors, a range image processing unit including circuitry that calculates, based on charge integrated in each of the charge storage units, a distance from the light-receiving unit to an object in the measurement space as a measurement distance, and a measurement control unit including circuitry that calculates a thinning time according to integrated charge in the charge storage units, the distance, and intensity of incident light. The photoelectric conversion element generates the charge according to the incident light incident from the measurement space targeted for measurement, the charge storage units are N charge storage units where N≥3 and integrate the charge in a frame cycle, the transfer transistors transfer the charge to the charge storage units from the photoelectric conversion element, the pixel drive circuit turns on or off the transfer transistors for the charge storage units at predetermined integration timing synchronizing with emission of light pulses to distribute and integrate the charge, the thinning time is the number of times thinning processing is performed in which the charge in the charge storage units is not integrated, in terms of an integration time that is the number of times integration of integrating the charge is performed, the integrated charge is divided by a reference charge as a preset reference integrated charge, and using a charge ratio resulting from the division, a measurement zone, to which the measurement distance belongs, is determined from among measurement zones established according to zone thresholds set according to multiple charge ratios, and integration of the charge in the charge storage units is controlled according to the thinning time set in the measurement zone as determined.

According to yet another aspect of the present invention, a method for controlling a range imaging device includes emitting light pulses in a measurement space targeted for measurement by a light source of the range imaging device, turning on or off transfer transistors that transfer charge to charge storage units of the range imaging device from a photoelectric conversion element of the range imaging device, calculating, based on charge integrated in each of the charge storage units, a distance from the range imaging device to an object in the measurement space as a measurement distance, and calculating a thinning time in terms of an integration time according to integrated charge in the charge storage units, the distance, and intensity of incident light. The range imaging device includes a pixel drive circuit that turns on or off the transfer transistors for the charge storage units at the predetermined integration timing synchronizing with the emission of the light pulses to distribute and integrate the charge, a range image processing unit including circuitry that calculates, based on the charge integrated in each of the charge storage units, the distance from the range imaging device to the object in the measurement space as the measurement distance, and the measurement control unit including circuitry that calculates the thinning time in terms of the integration time according to integrated charge in the charge storage units, the distance, and the intensity of the incident light, the calculating the thinning time includes determining a measurement zone, to which the measurement distance belongs, from among measurement zones established according to zone thresholds set according to multiple distances from the range imaging device, and controlling integration of the charge in the charge storage units according the thinning time set in the measurement zone as determined, the thinning time is the number of times thinning processing is performed in which the charge in the charge storage units is not integrated, and the integration time is a number of times integration of integrating the charge is performed.

According to still another aspect of the present invention, a method for controlling a range imaging device includes emitting light pulses in a measurement space targeted for measurement by a light source of the range imaging device, turning on or off transfer transistors that transfer charge to charge storage units of the range imaging device from a photoelectric conversion element of the range imaging device, calculating, based on charge integrated in each of the charge storage units, a distance from the range imaging device to an object in the measurement space as a measurement distance, and calculating a thinning time in terms of an integration time according to integrated charge in the charge storage units, the distance, and intensity of incident light. The range imaging device includes a pixel drive circuit configured to turn on or off the transfer transistors for the charge storage units at the predetermined integration timing synchronizing with the emission of the light pulses to distribute and integrate the charge, a range image processing unit including circuitry that calculates, based on the charge integrated in each of the charge storage units, the distance from the range imaging device to the object in the measurement space as the measurement distance, and the measurement control unit including circuitry that calculates the thinning time in terms of the integration time according to integrated charge in the charge storage units, the distance, and the intensity of the incident light, the calculating the thinning time includes dividing the integrated charge by reference charge as preset reference integrated charge and, using a charge ratio resulting from the division, determining a measurement zone, to which the measurement distance belongs, from among measurement zones established according to zone thresholds set according to multiple charge ratios, and controlling integration of the charge in the charge storage units according the thinning time set in the measurement zone as determined, the thinning time is the number of times thinning processing is performed in which the charge in the charge storage units is not integrated, and the integration time is the number of times integration of integrating the charge is performed, as performed by the measurement control unit.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 4 is a block diagram illustrating a configuration example of a measurement control unit in a range imaging device according to the first embodiment of the present invention;

FIG. 5 is a conceptual diagram illustrating measurement zone determination performed by a zone determination section according to the first embodiment of the present invention;

FIG. 6A is a diagram illustrating an example of a thinning time table which is established for each measurement zone in a thinning time table storage according to an embodiment of the present invention;

FIG. 6B is a diagram illustrating an example of a thinning time table which is established for each measurement zone in a thinning time table storage according to an embodiment of the present invention;

FIG. 6C is a diagram illustrating an example of a thinning time table which is established for each measurement zone in a thinning time table storage according to an embodiment of the present invention;

DETAILED DESCRIPTION OF THE EMBODIMENTS

Figure 1:
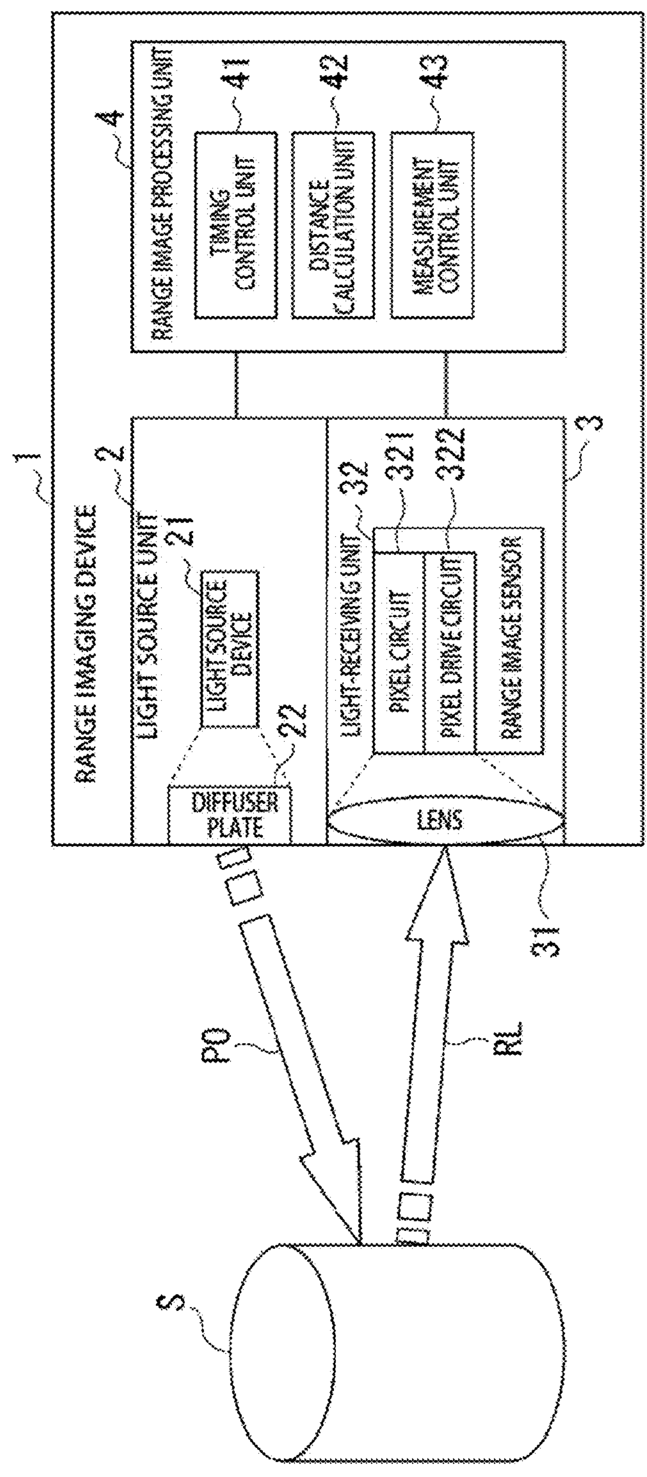
FIG. 1 is a schematic block diagram illustrating a configuration of a range imaging device according to a first embodiment of the present invention.

Embodiments will now be described with reference to the accompanying drawings, wherein like reference numerals designate corresponding or identical elements throughout the various drawings.

First Embodiment

With reference to the drawings, a first embodiment of the present invention will be described.

FIG. 1 is a schematic block diagram illustrating a configuration of a range imaging device according to the first embodiment of the present invention. FIG. 1 shows a range imaging device 1 that is a TOF type range imaging device including a light source unit 2, a light-receiving unit 3, and a range image processing unit 4. FIG. 1 also shows an object S whose distance is to be measured by the range imaging device 1. A range imaging device may be, for example, a range image sensor 32 (described later) in the light-receiving unit 3.

The light source unit 2 emits light pulses PO into a space as an imaging target where the object S is present whose distance is to be measured by the range imaging device 1 under the control of the range image processing unit 4. The light source unit 2 may be, for example, a surface emitting type semiconductor laser module such as a vertical cavity surface emitting laser (VCSEL). The light source unit 2 includes a light source device 21 and a diffuser plate 22.

The light source device 21 is a light source that emits laser light in the near infrared wavelength band (e.g., wavelength band of 850 nm to 940 nm) which serves as the light pulses PO to be emitted to the object S. The light source device 21 may be, for example, a semiconductor laser light emitting element. The light source device 21 emits pulsed laser light under the control of a timing control unit 41.

The diffuser plate 22 is an optical component that diffuses laser light in the near infrared wavelength band emitted from the light source device 21 over the emission surface area of the object S. Pulsed laser light diffused by the diffuser plate 22 is emitted as the light pulses PO and applied to the object S.

The light-receiving unit 3 receives reflected light RL arising from reflection of the light pulses PO from the object S, which is an object whose distance is to be measured by the range imaging device 1, and outputs a pixel signal according to the received reflected light RL. The light-receiving unit 3 includes a lens 31 and a range image sensor 32.

The lens 31 is an optical lens that guides the incident reflected light RL to the range image sensor 32. The lens 31 outputs the incident reflected light RL toward the range image sensor 32, so that the light can be received by (be incident on) pixel circuits provided to the light-receiving region of the range image sensor 32.

The range image sensor 32 is an imaging device used for the range imaging device 1. The range image sensor 32 includes multiple pixel circuits 321 which are formed in an array (two-dimensional array, or in other words, in a matrix) in a two-dimensional light-receiving region, and a pixel drive circuit 322 that controls the pixel circuits 321.

The pixel circuits 321 each include one photoelectric conversion element (e.g., photoelectric conversion element PD described later), multiple charge storage units (e.g., charge storage units CS1 to CS4 described later) corresponding to this photoelectric conversion element, and components that distribute charge to the individual charge storage units.

The range image sensor 32 distributes charge, which has been generated by the photoelectric conversion element under the control of the timing control unit 41, to the charge storage units. Also, the range image sensor 32 outputs pixel signals according to the charge distributed to the charge storage units. The range image sensor 32, in which multiple pixel circuits are formed in a two-dimensional matrix, outputs single-frame pixel signals of the [0032]

The range image processing unit 4 controls the range imaging device 1 and calculates a distance to the object S.

The range image processing unit 4 includes the timing control unit 41, a distance calculation unit 42, and a measurement control unit 43.

The timing control unit 41 controls timing of outputting several control signals required for measuring a distance, under the control of the measurement control unit 43. The various control signals refer to, for example, a signal for controlling emission of the light pulses PO, a signal for distributing the reflected light RL to the charge storage units, a signal for controlling the number of times of distribution per frame, and other signals. The number of times of distribution refers to an integration time described later, i.e., the number of times of repeating the processing of distributing charge to the charge storage units CS (see FIG. 2) in each of unit integration periods forming the integration period in a frame.

The distance calculation section 42 outputs distance information indicating a di stance to the object S calculated based on the pixel signals outputted from the range image sensor 32, under the control of the measurement control unit 43. The distance calculation unit 42 calculates a delay time Td from when the light pulses PO are emitted until when the reflected light RL is received, based on the charge integrated in the charge storage units CS. The distance calculation unit 42 calculates a distance from the range imaging device 1 to the object S according to the calculated delay time Td.

The measurement control unit 43 thins the integration processing, i.e., subtracts the thinning time from the integration time, so that the charge storage units will not be saturated to thereby calculate a corrected integration time according to the distance to the object S.

In each frame repeated in the frame cycle, the measurement control unit 43 causes the light source unit 2 to emit the light pulses PO, causes the timing control unit 41 to distribute charge, which is generated due to incident light in the photoelectric conversion element in each pixel circuit (pixel circuit 321) described later, to the charge storage units for integration therein, and causes the distance calculation unit 42 to control calculation, according to the corrected integration time after thinning (after subtraction) (details will be described later).

Specifically, the range imaging device according to the present embodiment calculates the distance between an object and the range image sensor 32 based on the charge integrated in the charge storage units CS. Therefore, if the intensity of incident light is high and the charge generated in the photoelectric conversion element exceeds the capacity of the charge storage units CS during calculation of a measurement distance (measured distance between the range imaging device 1 and the object), it will be difficult to correctly calculate a distance between the range imaging device 1 and the object S through measurement distance calculation.

Furthermore, as the distance from the range imaging device 1 to the object S increases, or as the reflectance of the object S decreases, the intensity of the reflected light arising from reflection of the light pulses PO from the object S decreases.

Accordingly, the charge generated due to the reflected light in the photoelectric conversion element also decreases, and thus, being affected by noise, the accuracy of calculating a measurement distance decreases. For this reason, the integration time is increased.

Based on the charge integrated in the charge storage units resulting from the above processing, auto exposure processing is performed to control the integration time or the emission time of the light pulses PO.

Herein, if the intensity of reflected light decreases, the integration time is increased to increase the number of times that charge generated in the photoelectric conversion element by reflected light is integrated, and thus, charge required for calculating a measurement distance is integrated in the charge storage units, by which the accuracy in distance as obtained will be improved.

However, if the integration time is simply increased in order to measure a distance, the emission time of the light pulses PO may also be increased. In this case, it is unavoidable that laser light is continued to be actively and deliberately emitted to the objects including humans.

Therefore, in the present embodiment, considering the case where the objects include humans, measurement control is performed under which the effects of laser light on humans are reduced to satisfy eye-safety standards (e.g., suppress exposure, to be a level not exceeding the maximum permissible exposure) (detailed processing will be described later).

With this configuration, in the range imaging device 1, the light source unit 2 emits the light pulses PO in the near infrared wavelength band to the object S, the light-receiving unit 3 receives the reflected light RL reflected from the object S, and the range image processing unit 4 outputs distance information indicating a distance between the object S and the range imaging device 1.

Although FIG. 1 shows a range imaging device 1 configured to include the range image processing unit 4 inside thereof, the range image processing unit 4 may be a component provided external to the range imaging device 1.

Herein, the configuration of each pixel circuit 321 in the range image sensor 32 will be described.

Figure 2:
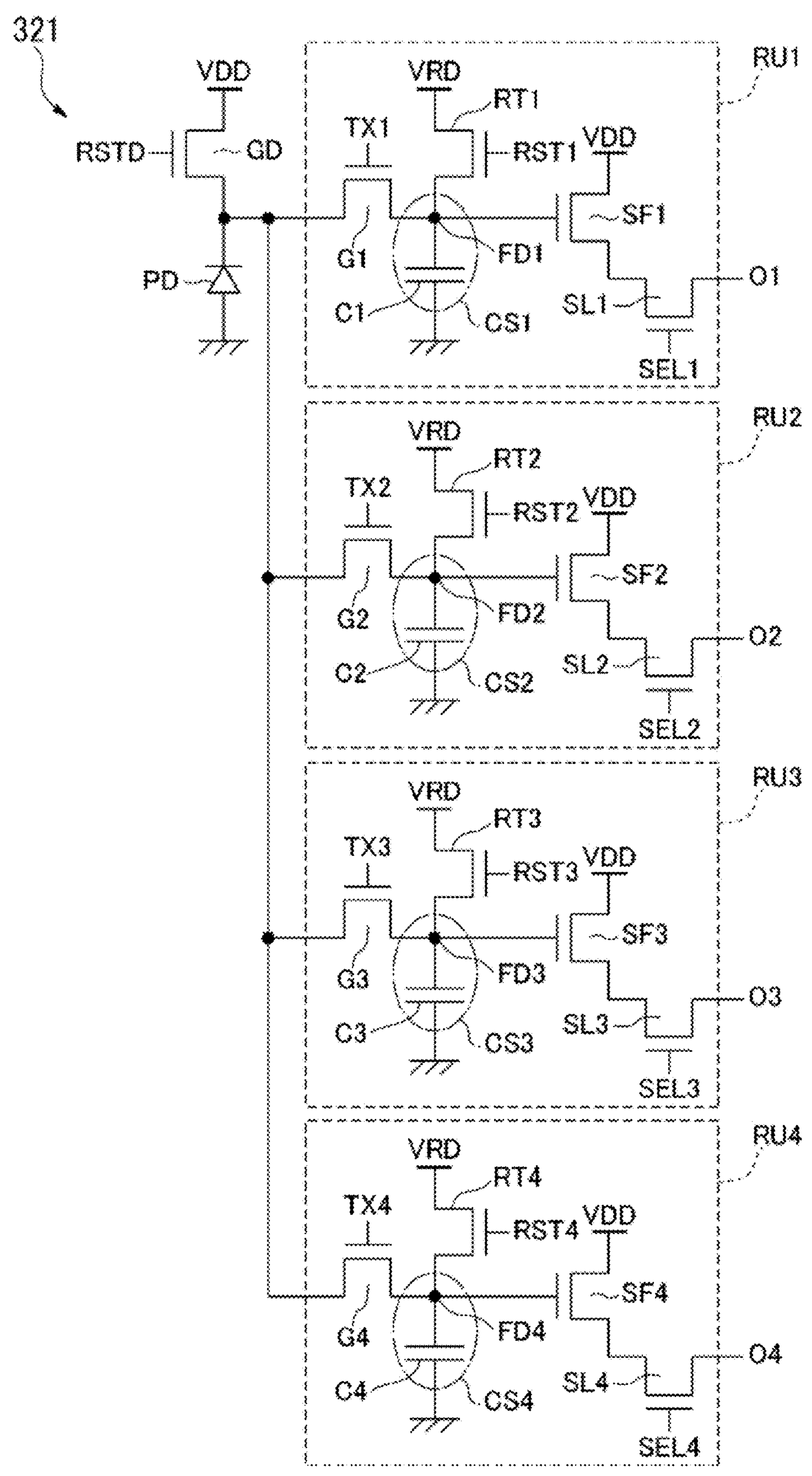
FIG. 2 is a circuit diagram illustrating an example of a configuration of a pixel circuit disposed in a range image sensor in a range imaging device according to the first embodiment of the present invention.

FIG. 2 is a circuit diagram illustrating an example of a configuration of a pixel circuit 321 disposed in the range image sensor 32 in the range imaging device according to the first embodiment of the present invention. The pixel circuit 321 shown in FIG. 2 is a configuration example including, for example, four pixel signal readouts RU1 to RU4. The configuration of the pixel circuit 321 of the present embodiment is only an example and includes three or more, i.e., N (N≥3), pixel signal readouts.

The pixel circuit 321 includes one photoelectric conversion element PD, a charge discharge transistor GD, and four pixel signal readouts RU (RU1 to RU4) which output voltage signals from respective output terminals O. Each of the pixel signal readouts RU includes a transfer transistor G, floating diffusion FD, charge storage capacity C, reset transistor RT, source follower transistor SF, and selection transistor SL. The floating diffusions FD (FD1, FD2, FD3, FD4) and the charge storage capacities C (C1, C2, C3, C4) configure the charge storage units CS (CS1, CS2, CS3, CS4).

In the pixel circuit 321 shown in FIG. 2, the pixel signal readout RU1 which outputs a voltage signal from an output terminal O1 includes a transfer transistor G1 (transfer MOS transistor), floating diffusion FD1, charge storage capacity C1, reset transistor RT1, source follower transistor SF1, and selection transistor SL1. In the pixel signal readout RU1, the floating diffusion FD1 and the charge storage capacity C1 configure a charge storage unit CS1. The pixel signal readouts RU2, RU3 and RU4 are configured similarly.

The photoelectric conversion element PD is an embedded photodiode which performs photoelectric conversion for incident light, generates charge corresponding to the incident light, and integrates the generated charge. In the present embodiment, incident light is incident from a space as a measurement target.

In the pixel circuit 321, charge generated by photoelectric conversion of incident light by the photoelectric conversion element PD is distributed to the four charge storage units CS (CS1 to CS4), and voltage signals corresponding to the distributed charge are outputted to the range image processing unit 4.

The configuration of each pixel circuit disposed in the range image sensor 32 is not limited to the configuration, as shown in FIG. 2, provided with the four pixel signal readouts RU (RU1 to RU4), but the pixel circuit may be configured to include one or more pixel signal readouts RU.

In response to each pixel circuit 321 of the range imaging device 1 being driven, the light pulses PO are emitted for an emission time To and reflected light RL is received by the range image sensor 32 after a delay time Td. Under the control of the timing control unit 41, the pixel drive circuit 322 causes integration drive signals TX1 to TX4 to supply charge generated in the photoelectric conversion element PD to the transfer transistors G1, G2, G3, G4 according to their respective timings in synchronization with emission of the light pulses PO, for sequential integration in the charge storage units CS1, CS2, CS3, CS4.

The pixel drive circuit 322 controls the reset transistors RT and the selection transistors SL using drive signals RST and SEL. The pixel drive circuit 322 causes the source follower transistors SF to convert the charge integrated in the charge storage units CS into electrical signals, and outputs the generated electrical signals to the distance calculation unit 42 via the output terminals O.

Under the control of the timing control unit 41, the pixel drive circuit 322 discharges the charge generated in the photoelectric conversion element PD to a power source VDD (erases the charge) using a drive signal RSTD.

Figure 3:
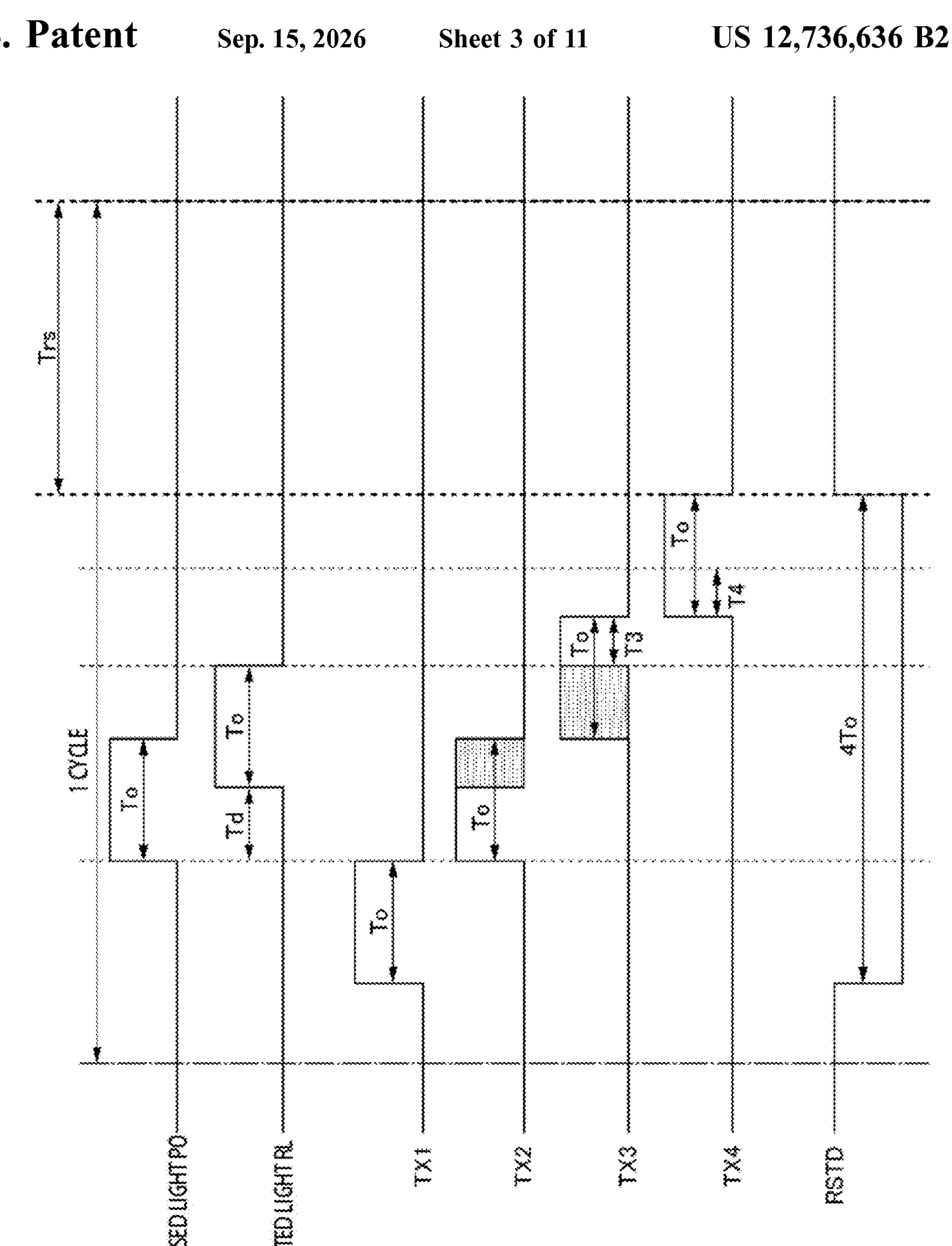
FIG. 3 is a timing chart illustrating transfer of charge generated in a photoelectric conversion element to individual charge storage units according to the first embodiment of the present invention.

FIG. 3 is a timing chart illustrating transfer of charge generated in the photoelectric conversion element PD to the individual charge storage units CS.

In the timing chart of FIG. 3, the vertical axis indicates pulse level and the horizontal axis indicates time. The timing chart also shows an integration cycle of the unit integration period which is repeated during the charge integration period in a frame. The timing chart shows a correlation between the light pulses PO and the reflected light RL on the time axis, timing of integration drive signals TX1 to TX4 supplied to the respective transfer transistors G1 to G4, and timing of the drive signal RSTD supplied to the charge discharge transistor GD.

The timing control unit 41 causes the light source unit 2 to emit the light pulses PO to the measurement space. Thus, the light pulses PO are reflected by the object and received by the light-receiving unit 3 as reflected light RL. Also, the photoelectric conversion element PD generates charge corresponding to ambient light and the reflected light RL. The pixel drive circuit 322, which transfers charge generated in the photoelectric conversion element PD to the charge storage units CS1 to CS4, performs switching control (on-off processing) for the transfer transistors G1 to G4.

In other words, the pixel drive circuit 322 supplies the integration drive signals TX1 to TX4 to the transfer transistors G1 to G4 as H-level signals with a predetermined duration (emission time To, i.e., the same duration as the pulse width).

The pixel drive circuit 322, for example, turns on the transfer transistor G1 provided on the transfer path through which charge is transferred to the charge storage unit CS1 from the photoelectric conversion element PD. Thus, the charge photoelectrically converted by the photoelectric conversion element PD is integrated in the charge storage unit CS1 via the transfer transistor G1. After that, the pixel drive circuit 322 turns off the transfer transistor G1. Thus, charge transfer to the charge storage unit CS1 is stopped. In this way, the pixel drive circuit 322 causes the charge storage unit CS1 to integrate charge. The same applies to other charge storage units CS2, CS3 and CS4.

In this case, in a charge integration period in which charge is distributed to the charge storage units CS (period in which charge is integrated in the charge storage units CS in a frame), the integration cycle (the cycle in which charge is stored and integrated) is repeated so that the integration drive signals TX1, TX2, TX3, TX4 are supplied to the transfer transistors G1, G2, G3, G4.

Thus, charge corresponding to the incident light is transferred to the charge storage units CS1, CS2, CS3, CS4 from the photoelectric conversion element PD via the transfer transistors G1, G2, G3, G4. The integration cycle is repeated multiple times in the charge integration period.

Thus, charge is integrated in the charge storage units CS1, CS2, CS3, CS4 every integration cycle of each of the charge storage units CS1, CS2, CS3, CS4 in the charge integration period.

When repeating the integration cycle of each of the charge storage units CS1, CS2, CS3, CS4, after completing charge transfer (distribution) to the charge storage unit CS4, the pixel drive circuit 322 turns on the charge discharge transistor GD provided on the discharge path through which charge is discharged from the photoelectric conversion element PD, by supplying an H-level drive signal RSTD thereto.

Thus, the charge discharge transistor GD discards the charge generated in the photoelectric conversion element PD before restarting the integration cycle of the charge storage unit CS1 and after completing the previous integration cycle of the charge storage unit CS4 (i.e., the photoelectric conversion element PD is reset).

The pixel drive circuit 322 sequentially performs signal processing such as A/D conversion processing for the voltage signals from all the pixel circuits 321 disposed in the light-receiving unit 3 for each row (horizontal array) of the pixel circuits 321.

After that, the pixel drive circuit 322 sequentially outputs the voltage signals subjected to signal processing to the distance calculation unit 42, in the order of columns of the pixel circuits disposed in the light-receiving unit 3.

As described above, the pixel drive circuit 322 repeatedly integrates charge in the charge storage units CS and discards charge photoelectrically converted by the photoelectric conversion element PD over one frame. Thus, charge corresponding to the amount of light received by the range imaging device 1 in a predetermined time interval is integrated in the individual charge storage units CS. The pixel drive circuit 322 outputs electrical signals corresponding to single-frame charges integrated in each of the charge storage units CS to the distance calculation unit 42.

Due to the relationship between the timing of emitting the light pulses PO and the timing of integrating charge in each of the charge storage units CS (CS1 to CS4) (integration timing), charge corresponding to external light components (ambient light charge), such as a ambient light component before emission of the light pulses PO, is held in the charge storage unit CS1. Also, charge corresponding to the reflected light RL and the external light component is distributed and held in the charge storage units CS2, CS3 and CS4. Distribution of charge to the charge storage units CS2 and CS3 or the charge storage units CS3 and CS4 (distribution ratio) can be expressed by a ratio according to the delay time Td from when the light pulses PO are reflected by the object S until when the reflected light is incident on the range imaging device 1.

Referring back to FIG. 1, the distance calculation unit 42 calculates a delay time Td using this principle through the following Formula (1) or Formula (2).

$$Td=To\times(Q3-Q1)/(Q2+Q3-2\times Q1) \quad (1)$$

$$Td=To+To\times(Q4-Q1)/(Q3+Q4-2\times Q1) \quad (2)$$

where To represents the period of emitting the light pulses PO, Q1 represents charge integrated in the charge storage unit CS1, Q2 represents charge integrated in the charge storage unit CS2, Q3 represents charge integrated in the charge storage unit CS3, and Q4 represents charge integrated in the charge storage unit CS4. For example, if Q4=Q1, the distance calculation unit 42 calculates a delay time Td using Formula (1) and, if Q2=Q1, calculates a delay time Td using Formula (2).

In Formula (1), charge generated due to reflected light is integrated in the charge storage units CS2 and CS3, but is not integrated in the charge storage unit CS4. In Formula (2), charge generated due to reflected light is integrated in the charge storage units CS3 and CS4, but is not integrated in the charge storage unit CS2.

In Formula (1) or (2), of the charges integrated in the charge storage units CS2, CS3 and CS4, the component corresponding to the external light component is assumed to be the same in amount as the charge integrated in the charge storage unit CS1.

The distance calculation unit 42 multiplies the delay time calculated through Formula (1) or (2) by the speed of light (velocity) to calculate a round-trip distance to the object S.

Then, the distance calculation unit 42 calculates ½ of the round-trip distance calculated above (delay time Td×c (light speed)/2) to calculate a distance to the object S from the range image sensor 32 (i.e., the range imaging device 1).

Time Trs represents the period of the drive signal RSTD supplied to the charge discharge transistor GD being at the H level so as not to allow charge generated due to incident light to remain (stay) in the photoelectric conversion element PD after completing distribution of charge to the charge storage unit CS4 from the photoelectric conversion element PD in one integration cycle shown in FIG. 3.

The time Trs is adjusted, while fixing the pulse width of the light pulses PO, to perform control under which the emission cycle of the light pulses PO can be changed as desired.

FIG. 4 is a block diagram illustrating a configuration example of the measurement control unit 43 in the range imaging device according to the first embodiment. In FIG. 4, the measurement control unit 43 includes a reference integration time setting section 431, zone determination section 432, thinning time selection section 433, operation control section 434, threshold storage 435, and thinning time table storage 436.

The reference integration time setting section 431 reads a preset reference integration time from the threshold storage 435 to select each thinning time corresponding to the distance to the object.

The reference integration time is set for the case where the distance to the object S from the range imaging device 1 and the reflectance of the object S are unknown. The pulse width of the light pulses is set according to a predetermined width.

The reference integration time is calculated, as an integration time the number of times as a result of subtracting a predetermined thinning time from a base integration time described later) corresponding to about one half of the storage capacitance of the charge storage units CS, by integrating charge in the charge storage units CS generated in the photoelectric conversion element PD by the reflected light RL arising from reflection of the light pulses PO with the above pulse width from an object when, for example, an object with a reflectance of 50% is located at a smallest measurement distance (e.g., 0.5 m) from the range imaging device 1.

The zone determination section 432 detects a smallest distance as a reference measurement distance in each of the pixel circuits 321 of the light-receiving unit 3, calculated by the distance calculation unit 42 with the reference integration time.

Then, the zone determination section 432 compares the detected reference measurement distance with a preset distance threshold (zone threshold, e.g., distance threshold LB1 or LB2 described later), and determines a measurement zone in which the reference measurement distance is included.

FIG. 5 is a conceptual diagram illustrating measurement zone determination performed by the zone determination section 432 according to the first embodiment.

A measurement zone Z1, a measurement zone Z2, and a measurement zone Z3 are provided in order of increasing distance from the range imaging device 1. The measurement zones Z1, Z2 and Z3 are defined by distance thresholds LB1 and LB2.

The distance thresholds LB1 and LB2, which are in a relationship LB1<LB2 (LB2 is larger than LB1), are calculated through experiments and the like to see whether charge required for measuring a measurement distance can be acquired, and set as predetermined distances in advance, so that an integration time and a pulse period for emitting light pulses satisfying eye-safety standards can be determined.

If the reference measurement distance is smaller than the distance threshold LB1, the zone determination section 432 determines that the object is in the distance range of the measurement zone Z1.

If the reference measurement distance is equal to or greater than the distance threshold LB1 and smaller than the distance threshold LB2, the zone determination section 432 determines that the object is in the distance range of the measurement zone Z2.

If the reference measurement distance is equal to or greater than the distance threshold LB2, the zone determination section 432 determines that the object is in the distance range of the measurement zone Z3.

The present embodiment is described assuming that there are three measurement zones; however, any number of measurement zones, as long as it is two or more, may be formed.

Referring back to FIG. 4, the thinning time selection section 433 refers to the thinning time table storage 436 and selects any one of multiple thinning times set in the measurement zone determined by the zone determination section 432.

Specifically, a thinning time table for each measurement zone is stored in advance in the thinning time table storage 436. Each thinning time table is stored, with ambient light intensity (external light intensity) being correlated with a thinning time.

FIGS. 6A to 6C are diagrams illustrating examples of the thinning time tables which are established for the respective measurement zones in the thinning time table storage 436. FIGS. 6A to 6C show thinning time tables corresponding to, for example, the measurement zones Z1, Z2 and Z3.

FIG. 6A shows a thinning time table TBL1 for the measurement zone Z1, FIG. 6B shows a thinning time table TBL2 for the measurement zone Z2, and FIG. 6C shows a thinning time table TBL3 for the measurement zone Z3.

In all of the measurement zones Z1, Z2 and Z3, the width and intensity of the light pulses PO, and the integration time for the charge storage units CS (on-time of the transfer transistors G) are the same and constant.

For example, assuming that the integration time when the thinning time is 0 (no thinning) is 3,500 as a base integration time, if ambient light intensity is 100,000 Lux in the measurement zone Z1, i.e., if the maximum storage capacity of the charge storage units CS is 4,080 LSB (least significant bit), charge integrated due to ambient light may be 3,000 LSB and the thinning time may be 1,500.

Similarly, in the case of 30,000 Lux, charge integrated due to ambient light may be 1,000 LSB and the thinning time may be 1,000. Similarly, in the case of 10,000 Lux, charge integrated due to ambient light may be 300 LSB and the thinning time may be 500. Without ambient light, charge integrated due to ambient light may be 0 LSB and the thinning time may be 0.

In the above description, a thinning time is used; however, a thinning ratio $\alpha$ ($0 \le \alpha \le 1$) may be set in the thinning time table corresponding to each measurement zone. In this case, the thinning time selection section 433 may select a thinning ratio $\alpha$ from the thinning time table corresponding to the measurement zone, the base integration time may be multiplied by the selected thinning ratio $\alpha$, and the multiplication result may be used as a thinning time.

Also, although a thinning time is used in the above, a correction ratio $\beta (0 \le \beta \le 1)$ may be set in the thinning time table corresponding to each measurement zone. In this case, the thinning time selection section 433 may select a correction ratio $\beta$ from the thinning time table corresponding to the measurement zone, the base integration time may be multiplied by the selected correction ratio $\beta$, and the multiplication result may be used as a corrected integration time.

Figure 7:
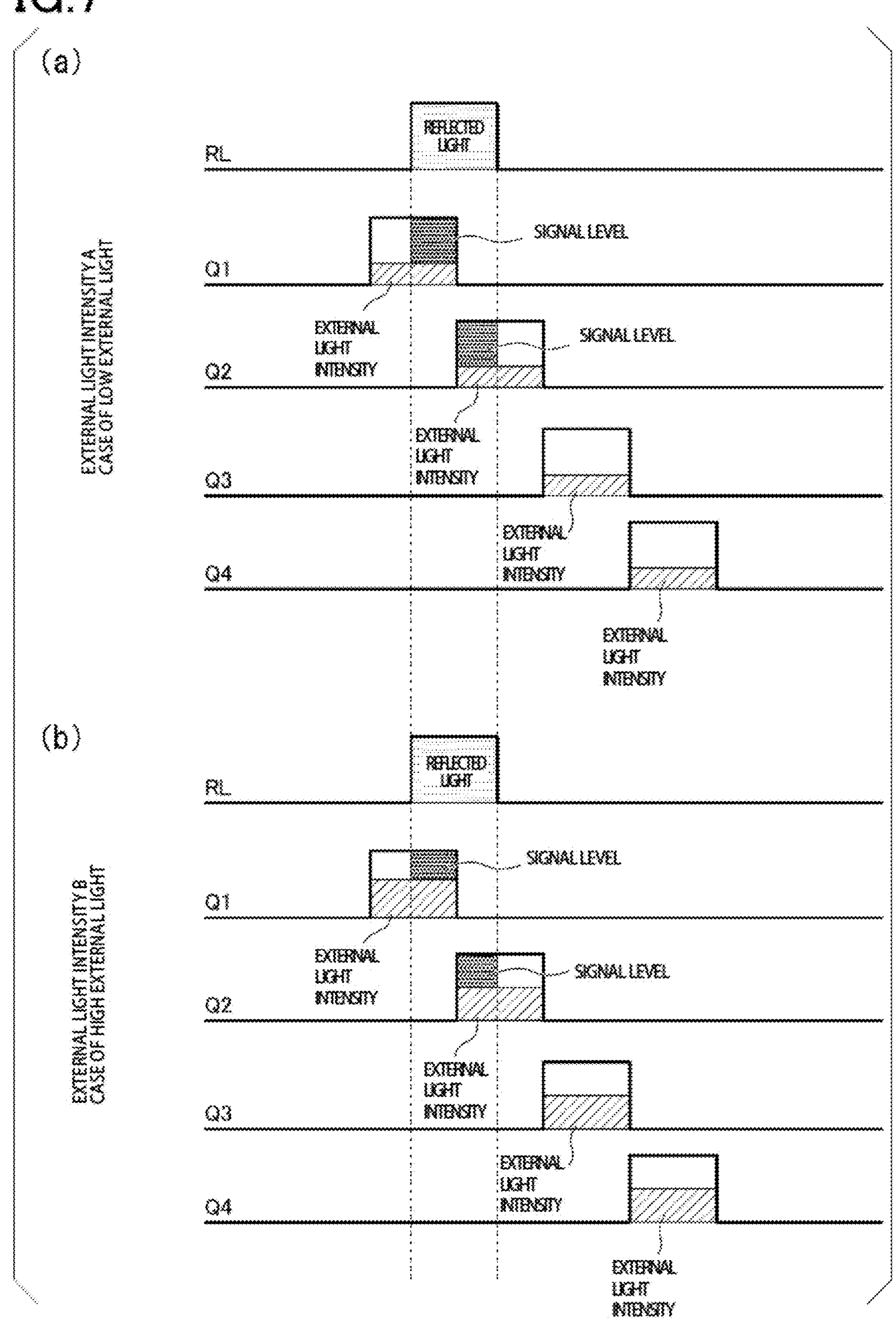
FIG. 7 is a set of diagrams each illustrating a correlation between charge generated due to reflected light and charge generated due to ambient light according to an embodiment of the present invention.

FIG. 7 is a set of diagrams each illustrating a correlation between charge generated due to the reflected light RL and charge generated due to ambient light. The diagrams of FIG. 7 are timing charts showing the reflected light RL arising from reflection of the light pulses PO from the object, and distribution of the charge generated due to the reflected light RL and ambient light (external light) to the charge storage units CS.

In the graph of the reflected light RL, the vertical axis indicates the intensity of the light pulses and the horizontal axis indicates time. The charges Q1, Q2, Q3, Q4 are charges distributed to the charge storage units CS1, CS2, CS3, CS4 by the on-off operation of the transfer transistors G1, G2, G3, G4. In each of the graphs of the charges Q1, Q2, Q3, Q4, the vertical axis indicates charge and the horizontal axis indicates time.

FIG. 7(*a*) shows the case where the intensity of ambient light is low. In this case, the charge storage units CS will not be saturated, even when the charge (signal level) due to the reflected light RL is integrated in the charge storage units CS by the base integration time.

FIG. 7(*b*) shows the case where the intensity of ambient light is high. In this case, the charge storage units CS may be saturated by the charge generated due to the ambient light even if the intensity of the reflected light RL is low and the charge generated due to the reflected light is small.

Therefore, a thinning time to be subtracted from the base integration time is set according to the charge generated due to ambient light so that the base integration time will be an integration time (corrected integration time) not saturating the charge storage units CS.

The base integration time is set for each of the pulse width, as the width of the light pulses PO, and the light pulse period in order to satisfy eye-safety standards (e.g., to suppress exposure so as not to exceed the maximum permissible exposure (MPE)).

Specifically, if the integration time is simply increased, the safety standards describing the effects on the human body (JIS C 6801 describing so-called eye-safety standards), or the above maximum permissible exposure, will not be necessarily satisfied due to the light pulses PO emitted from the light source unit 2.

Therefore, the width and pulse period of the light pulses PO are each set according to the base integration time.

Figure 8:
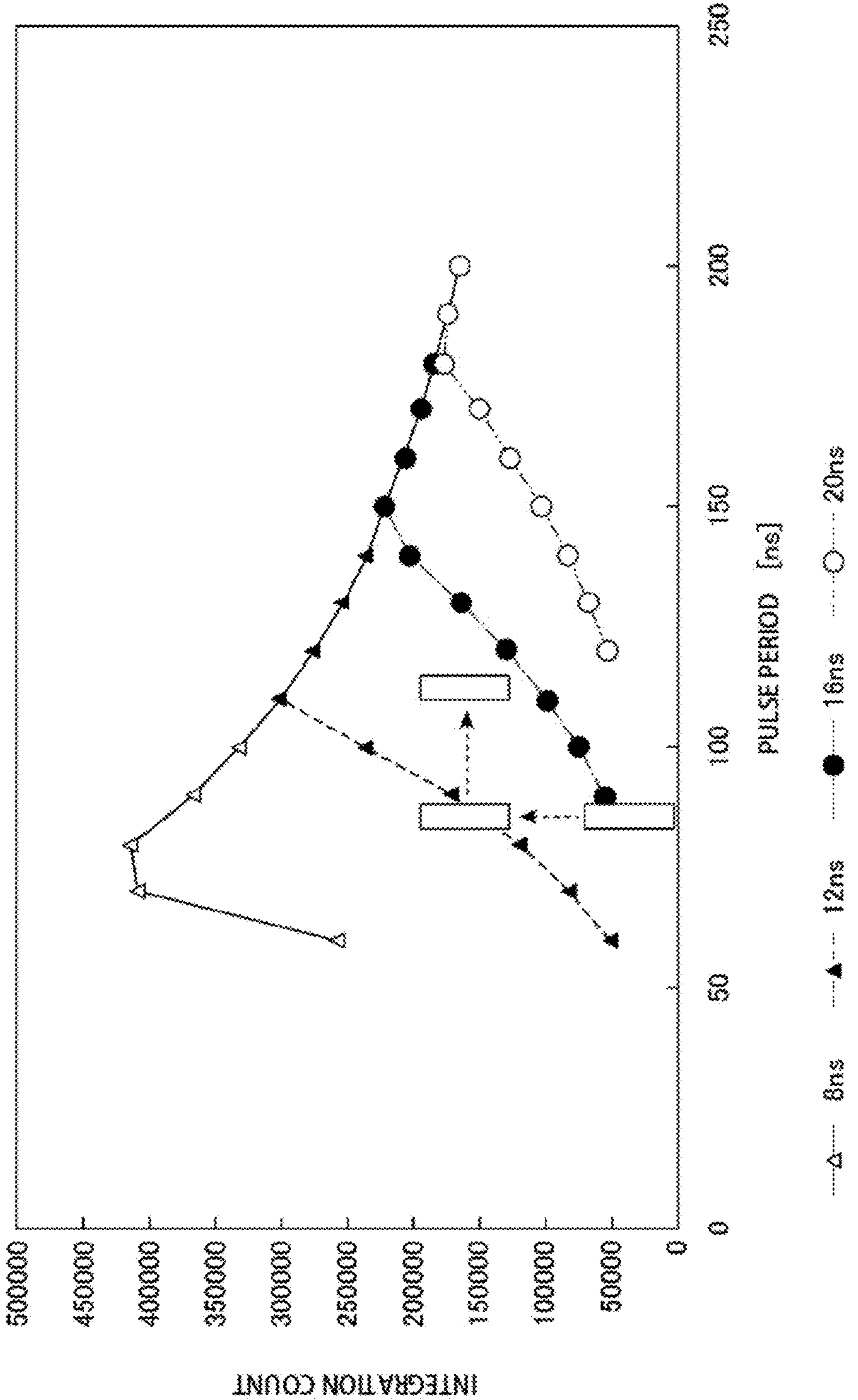
FIG. 8 is a diagram illustrating a relationship between a maximum permissible exposure and eye-safe level integration time and light pulse period according to an embodiment of the present invention.

FIG. 8 is a diagram illustrating a relationship between a maximum permissible exposure and eye-safe level integration time and light pulse period. In FIG. 8, the vertical axis indicates integration time and the horizontal axis indicates pulse period. As pulse widths, the solid line indicates 8 ns, the dashed line indicates 12 ns, the dash-dot line indicates 16 ns, and the dash-dot-dot line indicates 20 ns.

FIG. 8 shows limit lines of maximum permissible exposure determined by the integration time and the pulse period, calculated for the individual pulse widths of the light pulses PO having a predetermined intensity.

For example, it is shown that, when the 8 ns-width light pulses indicated by the solid line are used, a combination of the integration time above the solid line with the pulse width may allow exposure exceeding the maximum permissible exposure. The same applies to other pulse widths of 12 ns indicated by the dashed line, 16 ns indicated by the dash-dot line, and 20 ns indicated by the dash-dot-dot line.

For example, when the light pulses PO have a pulse width of 12 ns indicated by the dashed line and when the integration time is increased from 50,000 to 160,000 at a pulse period of 90 ns, the coordinate points determined by the integration time and the pulse period may be above the dashed line.

In other words, when the pulse period is 90 ns and the integration time is 160,000, exposure may exceed the eye-safety criteria for the pulse width of 12 ns.

Therefore, if the integration time is 160,000, the pulse period may be extended to 110 ns to bring the coordinate points determined by the integration time and the pulse period to a position below the dashed line.

Thus, the coordinate points can be positioned below the dashed line so that, if the integration time is set to 160,000 and the light pulses PO with the pulse width of 12 ns are repeatedly emitted 160,000 times, exposure can be lower than the eye-safety criteria for the pulse width of 12 ns (can satisfy the standards).

In the present embodiment, an light pulse period (i.e., time Trs) satisfying eye-safety standards is set for each integration time, being correlated with the intensity and width of the light pulses PO used, based on the relationship between the pulse width, integration time, and pulse period shown in FIG. 8.

Specifically, the light pulse period of the emission condition with the above base integration time is adjusted by changing the time Trs (see FIG. 3). Herein, from time Ts when the light pulses PO are emitted until the end of the integration cycle, the emission cycle is calculated as 2To (pulse width)+Trs, with the pulse period being 3To+Trs.

As described above, the thinning time is set based on the charge integrated through measurement for the maximum storage capacity of the charge storage units CS.

However, the light pulse period is calculated as a period that does not exceed the maximum permissible exposure calculated from the intensity and width of the light pulses used and the set base integration time.

If the emission cycle for emitting the light pulses PO is short, charge corresponding to the set integration time is integrated in the charge storage units CS, followed by reading the charges integrated in each of the charge storage units CS.

Then, after reading the charge, the various processing described above, such as distance calculation to the object or correction, are executed according to the charges read from the charge storage units CS.

In this case, since the duration of one frame is limited, as the time that can be used for distance calculation or correction is increased, the arithmetic load is decreased accordingly to stabilize the system operation.

Therefore, in normal setting, the shorter emission cycle of emitting the light pulses PO is more suitable, from the perspective of increasing the time that can be used for distance calculation or correction.

However, if the emission cycle of emitting the light pulses PO is excessively short, the delay time for the light reflected by the distant object to return becomes relatively longer, and this reflected light may be incident in the subsequent emission cycle for integration.

Accordingly, while the length of the emission time Trs in one integration is determined to be at some level or more, stability of the system operation will be improved more with a shorter emission cycle as described above, and therefore, the emission cycle is determined from the perspective of the integration time and eye-safety standards, in a comprehensive manner.

Referring back to FIG. 4, the thinning time selection section 433 outputs a corrected integration time calculated by subtracting the thinning time from the base integration time or by multiplying the base integration time by the correction ratio R as described above, to the operation control section 434.

In each frame repeated in the frame cycle, if a corrected integration time is selected by the thinning time selection section 433, the operation control section 434 causes the light source unit 2 to emit the light pulses PO, causes the timing control unit 41 to distribute charge, which is generated due to incident light in the photoelectric conversion element in each pixel circuit (pixel circuit 321) described later, to the charge storage units for integration therein, and causes the distance calculation unit 42 to control calculation, according to the corrected integration time.

Figure 9A:
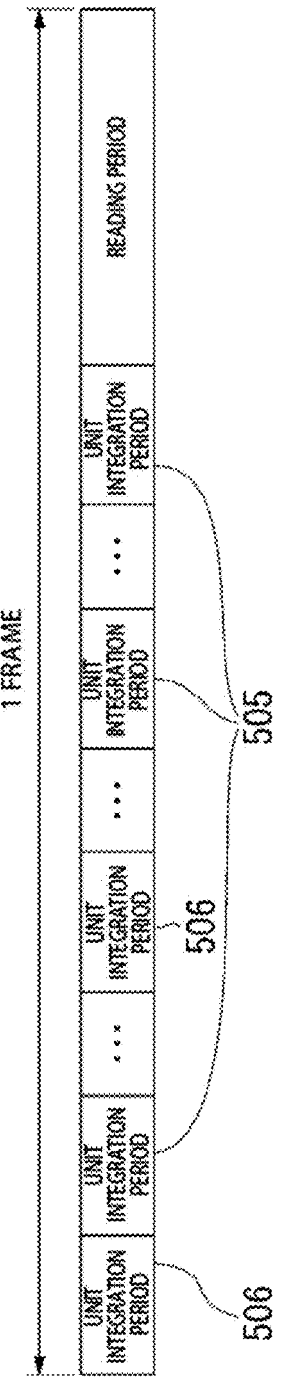
FIG. 9A is a diagram illustrating a frame which is configured by an integration period formed of unit integration periods in which charge is integrated in charge storage units, and a reading period in which integrated charge is sequentially read according to an embodiment of the present invention.
Figure 9B:
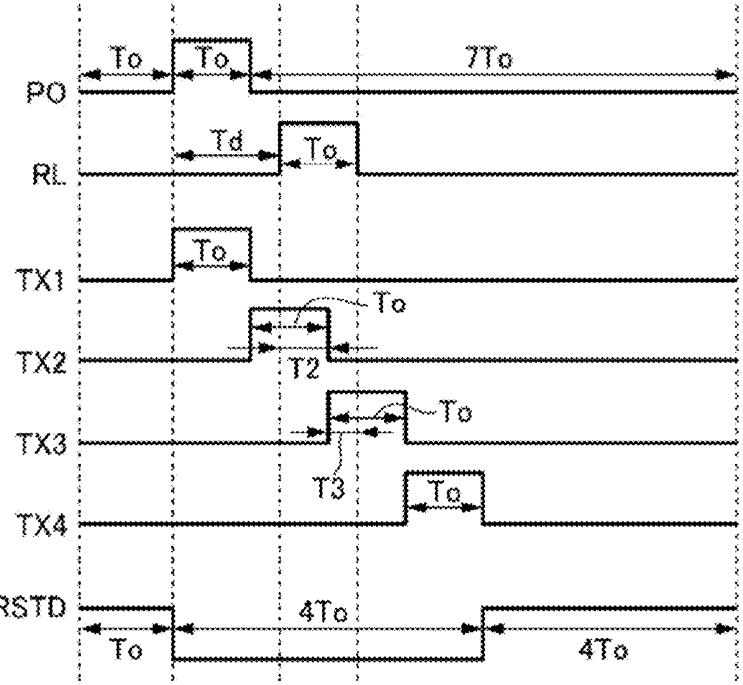
FIG. 9B is a diagram illustrating a unit integration period in which light pulses are emitted in a measurement space, and charge generated due to reflected light from an object is integrated in the charge storage units according to an embodiment of the present invention.
Figure 9C:
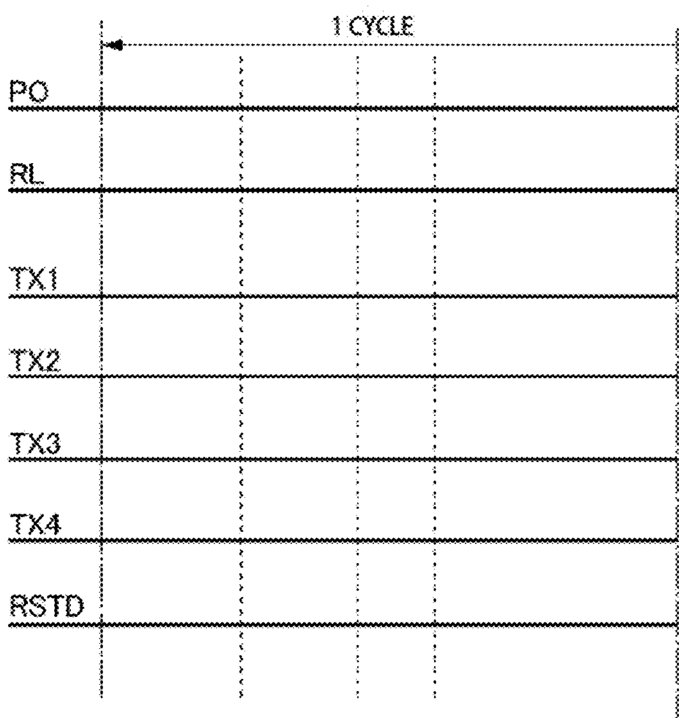
FIG. 9C is a timing chart illustrating a unit integration period targeted for thinning processing of an integration time according to an embodiment of the present invention.

FIGS. 9A to 9C are conceptual diagrams illustrating an example of control performed by the operation control section 434 for the light source unit 2 and the light-receiving unit 3 according to the corrected integration time.

FIG. 9A shows the configuration of 1 frame which is configured by an integration period, which is formed of multiple unit integration periods, during which charge is integrated in the charge storage units, and a reading period during which the integrated charge in the charge storage units CS of each of the pixel circuits 321 is sequentially read.

Each unit integration period 505, which is counted as a corrected integration time, indicates a unit integration period during which charge generated due to the reflected light RL is integrated. Each unit integration period 506, which is counted as a thinning time, indicates a unit integration period during which charge generated due to the reflected light RL is not integrated.

FIG. 9B is a diagram illustrating a unit integration period (the unit integration period 505) in which light pulses PO are emitted in a measurement space, and charge generated due to the reflected light RL from an object is integrated in the charge storage units CS.

Specifically, the diagram indicates emission of the light pulses PO from the light source unit 2, reception of the reflected light RL from an object arising from reflection of the light pulses PO, integration drive signals TX1, TX2, TX3, TX4 turning on or off the transfer transistors G1, G2, G3, G4, and a drive signal RSTD turning on or off the charge discharge transistor GD, in a unit integration period.

FIG. 9C is a diagram illustrating a unit integration period (the unit integration period 506) in which charge generated due to the reflected light RL is not integrated in the charge storage units CS, i.e., a thinning unit integration period.

In other words, FIG. 9C shows a timing chart in a unit integration period targeted for thinning processing of the integration time.

In this unit integration period, the operation control section 434 does not cause the light source unit 2 to emit the light pulses PO, and does not supply the integration drive signals TX1, TX2, TX3, TX4 to the respective transfer transistors G1, G2, G3, G4, while supplying the drive signal RSTD at H level to the charge discharge transistor GD.

Therefore, the reflected light RL from the object does not enter the photoelectric conversion element PD, charge generated due to ambient light is discharged due to the charge discharge transistor GD being in an on state, and no processing is performed for integrating charge generated due to the reflected light RL and ambient light in the charge storage units CS.

The operation control section 434 randomly selects unit integration periods to be targeted for thinning processing by random or pseudo-random numbers corresponding to the thinning time, from the unit integration periods forming the integration period.

In the unit integration periods selected as targets for thinning processing, as shown in the timing chart of FIG. 9C, the operation control section 434 does not cause the light source unit 2 to emit the light pulses PO, does not supply the integration drive signals TX1, TX2, TX3, TX4 to the respective transfer transistors G1, G2, G3, G4, and continuously supplies the H-level drive signal RSTD to the charge discharge transistor GD.

As described above, in the thinning processing described above referring to Fits. 9A to 9C, saturation of the charge storage units CS is suppressed by thinning the processing of distributing charge generated due to the reflected light RL to the charge storage units CS, i.e., by thinning unit integration periods in which the charge generated due to the reflected light RL is subjected to integration processing.

Figure 10:
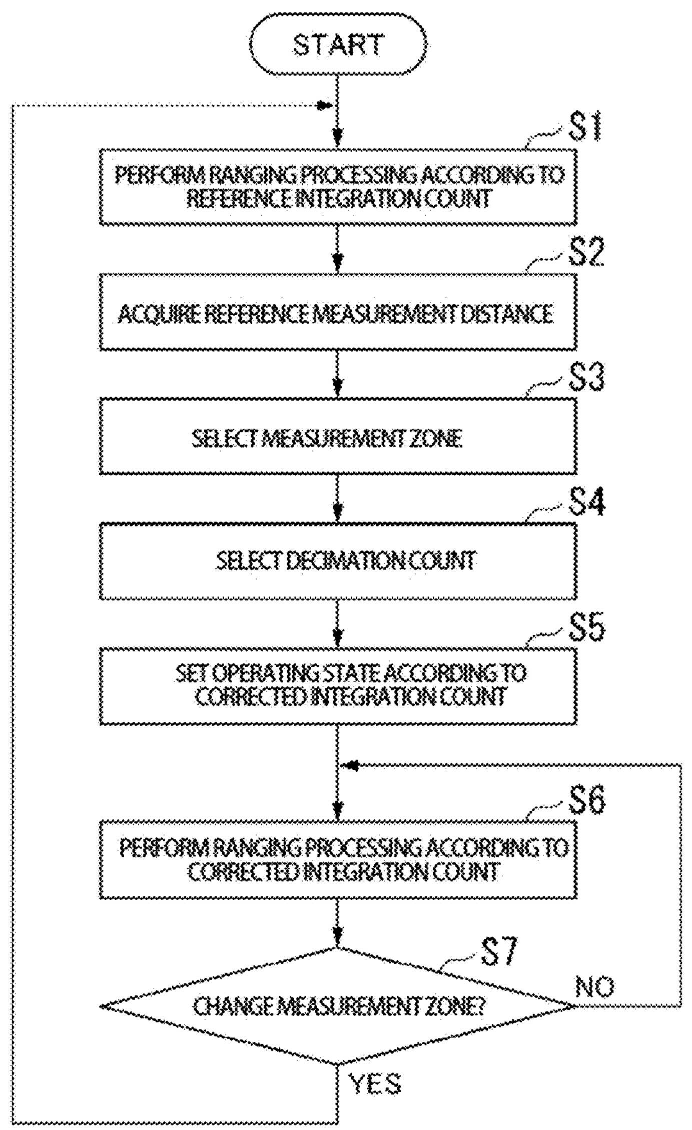
FIG. 10 is a flowchart illustrating an example of processing for calculating a distance between a range image sensor and an object performed by a range imaging device according to the first embodiment of the present invention.

FIG. 10 is a flowchart illustrating an example of the processing for calculating a distance between the range image sensor 32 and the object S performed by the range imaging device 1 according to the first embodiment. When the range imaging device 1 is activated, the following processing is started from step S1.

Step S1:

The reference integration time setting section 431 reads a reference integration time and a base integration time from the threshold storage 435 as a preset operating condition when activated.

Then, the reference integration time setting section 431 subtracts the reference integration time from the read base integration time to calculate a thinning time.

The reference integration time setting section 431 outputs the calculated thinning time and the reference integration time to the operation control section 434.

Thus, if a thinning time and a reference integration time are supplied from the reference integration time setting section 431, the operation control section 434 performs predetermined thinning control with respect to the light source unit 2 and the light-receiving unit 3 according to the reference integration time.

Specifically, the operation control section 434 randomly selects unit integration periods by the number corresponding to the thinning time from the unit integration periods repeated by the number of times corresponding to the reference integration time.

Then, the operation control section 434 performs non-operating scheduling to indicate the unit integration periods selected as targets for thinning processing from the time series unit integration periods in the integration period.

Step S2:

According to the non-operating scheduling, the operation control section 434 performs control corresponding to FIG. 9C in the unit integration periods subjected to thinning processing, with respect to the light source unit 2 and the light-receiving unit 3.

Specifically, as shown in FIG. 9C, charge is not integrated in the charge storage units CS in the unit integration periods selected by the number corresponding to the thinning time, but charge is integrated in the charge storage units CS only by the number of times corresponding to the reference integration time.

The pixel drive circuit 322 distributes charge generated due to the reflected light RL in the photoelectric conversion element PD to the charge storage units CS1, CS2, CS3, CS4 of each of the pixel circuits 321 for integration therein, according to the thinning time of the non-operating scheduling and the reference integration time.

Then, the distance calculation unit 42 calculates and acquires a distance (reference measurement distance) from the range imaging device 1 to the object according to the charge integrated in each of the charge storage units CS1, CS2, CS3, CS4.

Step S3:

The zone determination section 432 acquires a smallest reference measurement distance in the preset pixel circuit 321 region, calculated by the distance calculation unit 42, as a reference measurement distance for selecting a measurement zone.

Then, the zone determination section 432 compares the acquired reference measurement distance with the distance threshold LB1 and the distance threshold LB2 exceeding the distance threshold LB1.

If the reference measurement distance is smaller than the distance threshold LB1, the zone determination section 432 determines that the object nearest the range imaging device 1 is in the distance range of the measurement zone Z1.

If the reference measurement distance is equal to or greater than the distance threshold LB1 and smaller than the distance threshold LB2, the zone determination section 432 determines that the object nearest the range imaging device 1 is in the distance range of the measurement zone Z2.

Furthermore, if the reference measurement distance is equal to or greater than the distance threshold LB2, the zone determination section 432 determines that the object nearest the range imaging device 1 is in the distance range of the measurement zone Z3.

Then, the zone determination section 432 outputs the type of the determined measurement zone to the thinning time selection section 433.

Step S4:

If the type of the determined measurement zone is supplied from the zone determination section 432, the thinning time selection section 433 selects a thinning time table corresponding to the measurement zone from the thinning time table storage 436 to acquire a thinning time.

The thinning time selection section 433 acquires the ambient light charge (corresponding voltage) calculated from the pixel circuits 321 used when calculating the reference measurement distance, from the distance calculation unit 42.

Then, the thinning time selection section 433 refers to the thinning time table selected from the thinning time table storage 436 according to the measurement zone acquired from the zone determination section 432.

The thinning time selection section 433 reads a thinning time corresponding to the ambient light charge from the thinning time table referred to.

Also, the thinning time selection section 433 outputs the thinning time calculated as described above and the corrected integration time calculated by subtracting the thinning time from the base integration time to the operation control section 434.

Step S5:

If a thinning time and a reference integration time are supplied from the reference integration time setting section 431, the operation control section 434 randomly selects unit integration periods to be targeted for thinning processing by random or pseudo-random numbers corresponding to the thinning time, from the unit integration periods forming the integration period.

Then, the operation control section 434 performs non-operating scheduling to indicate the unit integration periods selected as targets for thinning processing from the time series unit integration periods in the integration period.

Thus, the operation control section 434 sets an operating state for each of the light source unit 2 and the light-receiving unit 3 according to the non-operating scheduling, in order to integrate charge corresponding to the corrected integration time in the charge storage units CS.

Step S6:

Then, the light source unit 2 emits the light pulses OP according to the predetermined cycle under the control corresponding to the non-operating scheduling performed by the operation control section 434, i.e., according to the integration cycle and emission time (integration time) of the operating light pulse emission condition corresponding to the base integration time.

Under the control corresponding to the non-operating scheduling performed by the operation control section 434, the pixel drive circuit 322 distributes charge generated due to the reflected light RL in the photoelectric conversion element PD to the charge storage units CS1, CS2, CS3, CS4 of each of the pixel circuits 321 for integration therein.

Then, the distance calculation unit 42 calculates a distance according to the charge integrated in each of the charge storage units CS1, CS2, CS3, CS4.

Step S7:

The zone determination section 432 detects pixel circuits 321 with a smallest distance and a greatest distance in the preset pixel circuit 321 region, calculated by the distance calculation unit 42.

Then, for each of the smallest distance and the greatest distance, the zone determination section 432 reads charge (voltage) of a charge storage unit CS with a greatest amount from among the charge storage units CS1, CS2, CS3, CS4.

In this case, if the voltage corresponding to the smallest distance is lower than a preset lower limit threshold or if the voltage corresponding to the greatest distance exceeds a preset upper limit threshold, the zone determination section 432 allows processing to proceed to step S1.

If the voltage corresponding to the smallest distance is lower than the preset lower limit threshold or if the voltage corresponding to the greatest distance exceeds the preset upper limit threshold, it means that the object nearest the range imaging device 1 is no longer present in the current measurement zone, and therefore, a reference measurement distance is measured again according to the reference integration time to change the measurement zone.

If the voltage corresponding to the smallest distance is equal to or higher than a preset lower limit threshold and if the voltage corresponding to the greatest distance is equal to or lower than a preset upper limit threshold, the zone determination section 432 allows processing to proceed to step S6.

If the voltage corresponding to the smallest distance is equal to or higher than the preset lower limit threshold and if the voltage corresponding to the greatest distance is equal to or lower than the preset upper limit threshold, it means that the object nearest the range imaging device 1 is present in the current measurement zone, and therefore, there is no need to change the measurement zone and thus a measurement distance is continued to be measured according to the current corrected integration time.

The lower limit threshold refers to a threshold indicating that charge with which a measurement distance can be measured maintaining accuracy has not yet been obtained.

The upper limit threshold refers to a threshold which is set as charge exceeding a predetermined percentage (e.g., 95%) of the maximum storage capacity of the charge storage units and thus refers to a threshold indicating that the charge storage units may be saturated.

In the present embodiment, whether to change the measurement zone has been determined using the lower limit threshold and the upper limit threshold; however, a reference measurement distance may be measured according to the reference integration time for each preset number of frames and a measurement mode may be selected.

With this configuration, for example, if the number of processed frames exceeds a frame threshold, i.e., a preset number of frames, at step S7, processing may proceed to step S1; however, if the number of processed frames is equal to or smaller than the frame threshold, processing may proceed to step S6.

As described above, according to the present embodiment, the reference measurement distance between the range imaging device 1 and the object obtained using a preset reference integration time is compared with the distance thresholds LB1 and LB2, a measurement zone where the object is present (the measurement zone where the object nearest the imaging device is present) is calculated from the comparison result, and an integration time (i.e., corrected integration time) achieving integrated charge that does not saturate the charge storage units CS is calculated according to the distance to the object nearest the range imaging device 1. Therefore, the charge storage units CS of all the pixel circuits 321 of the range image sensor 32 can be prevented from being saturated, an integration time can be suitably set so that charge is integrated in the charge storage units CS as much as possible without saturation, and accuracy in distance measurement in auto exposure can be improved in all the pixels of the range image compared to the conventional art.

According to the present embodiment, integration times corresponding to the respective ambient light intensities (external light intensities) are set in the integration time table of each measurement zone, and therefore, an integration time corresponding to the ambient light intensity measured in the ranging processing according to the reference integration time can be selected, and this can easily suppress saturation of the charge storage units due to the ambient light intensity.

According to the present embodiment, the base integration time is set as an emission condition satisfying eye-safety standards, according to the emission cycle (pulse period that is a cycle of emitting light pulses) and the width of light pulses. Therefore, if a distance is measured with the base integration time corresponding to the greatest emission time of light pulses, i.e., even in the state where pulsed light is continuously emitted without thinning, personal safety standards (eye-safety standards) can be satisfied.

Second Embodiment

Hereinafter, a second embodiment of the present invention will be described.

The range imaging device according to the second embodiment of the present invention has a configuration similar to that of the first embodiment shown in FIGS. 1 and 4.

Hereinafter, only operations different from those of the range imaging device of the first embodiment will be described.

In the present embodiment, the measurement control unit 43 thins the integration processing, i.e., subtracts the thinning time from the integration time according to the intensity of reflected light from the object S, so that the charge storage units will not be saturated to thereby calculate a corrected integration time.

In each frame repeated in the frame cycle, the measurement control unit 43 causes the light source unit 2 to emit the light pulses PO, causes the timing control unit 41 to distribute charge, which is generated due to incident light in the photoelectric conversion element in each pixel circuit (pixel circuit 321) described later, to the charge storage units for integration therein, and causes the distance calculation unit 42 to control calculation, according to the corrected integration time after thinning (after subtraction) (details will be described later).

In this case, the zone determination section 432 calculates charge (signal level) generated due to the reflected light RL, by removing ambient light charge from the charge in each of the charge storage units CS2, CS3, CS4 supplied from the pixel drive circuit 322.

The zone determination section 432 adds the integrated charge (voltage) of each of the charge storage units CS2, CS3, CS4 to calculate total charge generated due to the reflected light RL.

The zone determination section 432 reads the reference charge (reference value) from the threshold storage 435, divides the total charge by the reference charge, and outputs a charge ratio as the division result.

The reference charge is stored in advance in the threshold storage 435, and is defined to be a value obtained by adding the integrated charges of the charge storage units CS when integrated with the reference integration time. The reference charge is set as charge generated due to the reflected light RL and integrated in the charge storage units CS when integrated with the reference integration time (i.e., set as charge about half of the maximum storage capacity of the charge storage units CS).

The reference integration time refers to the integration time set according to the light pulse emission condition already described in the first embodiment.

Figure 11:
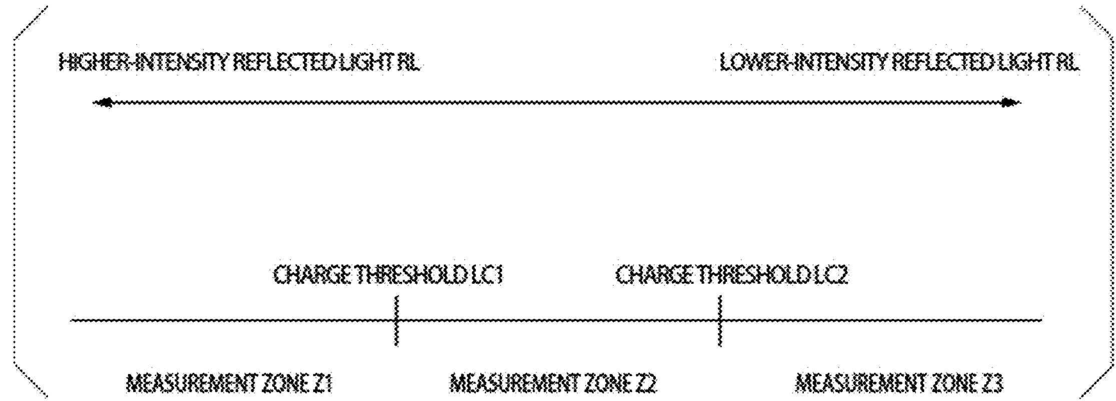
FIG. 11 is a conceptual diagram illustrating measurement zone determination performed by a zone determination section according to a second embodiment of the present invention.

FIG. 11 is a conceptual diagram illustrating measurement zone determination performed by the zone determination section 432 according to the second embodiment.

The measurement zone of the present embodiment is a zone that is a region in the range of high-intensity (large value) to low-intensity (small value) reflected light RL, in which a measurement zone Z1, a measurement zone Z2, and a measurement zone Z3 are provided in order of decreasing intensity from high to low. The measurement zones Z1, Z2 and Z3 are defined by charge ratio thresholds (zone thresholds) LC1 and LC2.

As in the first embodiment, in all of the measurement zones Z1, Z2 and Z3, the width and intensity of the light pulses PO, and the integration time for the charge storage units CS (on-time of the transfer transistors G) are the same and constant.

The charge ratio thresholds LC1 and LC2 are in a relationship LC1>LC2 (charge ratio relationship in which LC1 is larger than LC2), calculated through experiments or the like to determine whether charge not saturating the charge storage units CS and required for measuring a measurement distance can be acquired, and are set in advance as charge ratios corresponding to predetermined integrated charges.

If the charge ratio is equal to or higher than the charge ratio threshold LC1, the zone determination section 432 determines that the object is in the measurement condition range of the measurement zone Z1.

If the charge ratio is lower than the charge ratio threshold LC1 and equal to or higher than the charge ratio threshold LC2, the zone determination section 432 determines that the object is in the measurement condition range of the measurement zone Z2.

If the charge ratio is lower than the charge ratio threshold LC2, the zone determination section 432 determines that the object is in the measurement condition range of the measurement zone Z3.

The measurement condition range indicates a range of a measurement zone, i.e., indicates an intensity range of the reflected light RL which is determined by the distance from the range imaging device to the object, or the reflectance of the surface of the object, or both of the distance and the reflectance.

The present embodiment is described assuming that there are three measurement zones; however, any number of measurement zones, as long as it is two or more, may be formed.

Also, thinning time tables corresponding to the respective measurement zones are stored in advance in the thinning time table storage 436.

These thinning time tables are configured similarly to the integration time tables described in the first embodiment referring to FIGS. 6A to 6C.

Figure 12:
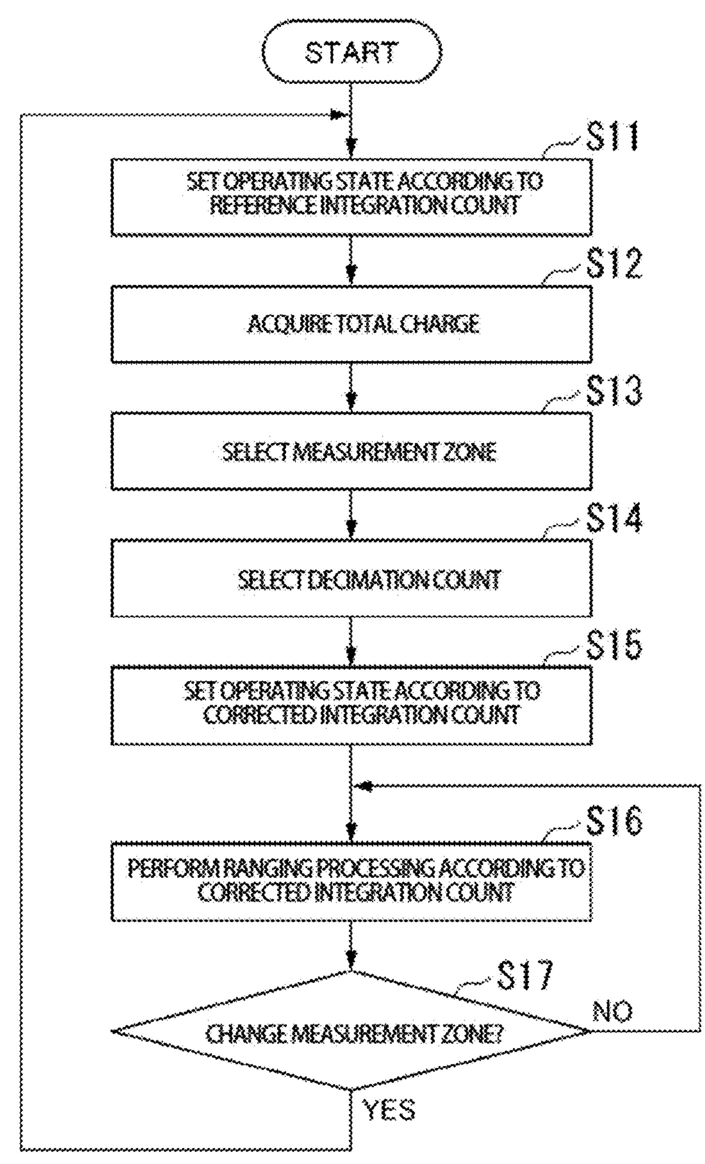
FIG. 12 is a flowchart illustrating an example of processing for calculating a distance between a range image sensor and an object performed by s range imaging device according to the second embodiment of the present invention.

FIG. 12 is a flowchart illustrating an example of the processing for calculating a distance between the range image sensor 32 and the object S performed by the range imaging device 1 according to the second embodiment. When the range imaging device 1 is activated, the following processing is started from step S11.

Step S11:

The reference integration time setting section 431 reads a reference integration time and a base integration time from the threshold storage 435 as a preset operating condition when activated.

Then, the reference integration time setting section 431 subtracts the reference integration time from the read base integration time to calculate a thinning time.

The reference integration time setting section 431 outputs the calculated thinning time and the reference integration time to the operation control section 434.

Thus, if a thinning time and a reference integration time are supplied from the reference integration time setting section 431, the operation control section 434 performs predetermined thinning control with respect to the light source unit 2 and the light-receiving unit 3 according to the reference integration time.

Specifically, the operation control section 434 randomly selects unit integration periods by the number corresponding to the thinning time from the unit integration periods repeated by the number of times corresponding to the reference integration time.

Then, the operation control section 434 performs non-operating scheduling to indicate the unit integration periods selected as targets for thinning processing from the time series unit integration periods in the integration period.

Step S12:

According to the non-operating scheduling, the operation control section 434 performs control corresponding to FIG. 9C in the unit integration periods subjected to thinning processing, with respect to the light source unit 2 and the light-receiving unit 3.

Specifically, as shown in FIG. 9C, charge is not integrated in the charge storage units CS in the unit integration periods selected by the number corresponding to the thinning time, but charge is integrated in the charge storage units CS only by the number of times corresponding to the reference integration time.

The pixel drive circuit 322 distributes charge generated due to the reflected light RL in the photoelectric conversion element PD to the charge storage units CS1, CS2, CS3, CS4 of each of the pixel circuits 321 for integration therein, according to the thinning time of the non-operating scheduling and the reference integration time.

Then, the distance calculation unit 42 calculates and acquires a distance from the range imaging device 1 to the object according to the charge integrated in each of the charge storage units CS1, CS2, CS3, CS4.

The zone determination section 432 acquires the charges Q1, Q2, Q3, Q4 integrated in the charge storage units CS1, CS2, CS3, CS4 from the distance calculation unit 42.

The zone determination section 432 subtracts the charge Q1 of the charge storage unit CS1, i.e., the charge generated due to ambient light, from each of the charges Q2, Q3, Q4.

Then, the zone determination section 432 adds the charges Q2, Q3, Q4 after subtraction of the charge Q1 due to ambient light, i.e., adds the charges generated due to the reflected light RL, and calculates total charge as the addition result (acquisition of total charge).

Step S13:

The zone determination section 432 acquires greatest total charge in the pixel circuits 321 of the range image sensor 32 as reference total charge.

The zone determination section 432 reads the reference charge from the threshold storage 435, divides the total charge by the reference charge, and calculates a charge ratio.

Then, the zone determination section 432 compares the calculated charge ratio with each of the charge ratio threshold LC1 and the charge ratio threshold LC2 lower than the charge ratio threshold LC1.

In this case, if the charge ratio is equal to or higher than the charge ratio threshold LC1, the zone determination section 432 determines that the object reflecting the reflected light RL with a highest intensity is within the measurement condition range of the measurement zone Z1.

If the charge ratio is lower than the charge ratio threshold LC1 and equal to or higher than the charge ratio threshold LC2, the zone determination section 432 determines that the object reflecting the reflected light RL with a highest intensity is within the measurement condition range of the measurement zone Z2.

If the charge ratio is lower than the charge ratio threshold LC2, the zone determination section 432 determines that the object reflecting the reflected light RL with a highest intensity is within the measurement condition range of the measurement zone Z3.

Then, the zone determination section 432 outputs the type of the determined measurement zone to the thinning time selection section 433.

Step S14:

If the type of the determined measurement zone is supplied from the zone determination section 432, the thinning time selection section 433 selects a thinning time table corresponding to the measurement zone from the thinning time table storage 436 to acquire a thinning time.

The thinning time selection section 433 acquires the ambient light charge Q1 (corresponding voltage) calculated from the pixel circuits 321 used when calculating the reference measurement distance, from the distance calculation unit 42.

Then, the thinning time selection section 433 refers to the thinning time table selected from the thinning time table storage 436 according to the measurement zone acquired from the zone determination section 432.

The thinning time selection section 433 reads a thinning time corresponding to the ambient light charge from the thinning time table referred to.

Also, the thinning time selection section 433 outputs the thinning time calculated as described above and the corrected integration time calculated by subtracting the thinning time from the base integration time to the operation control section 434.

Step S15:

If a thinning time and a reference integration time are supplied from the reference integration time setting section 431, the operation control section 434 randomly selects unit integration periods to be targeted for thinning processing by random or pseudo-random numbers corresponding to the thinning time, from the unit integration periods forming the integration period.

Then, the operation control section 434 performs non-operating scheduling to indicate the unit integration periods selected as targets for thinning processing from the time series unit integration periods in the integration period.

Thus, the operation control section 434 sets an operating state for each of the light source unit 2 and the light-receiving unit 3 according to the non-operating scheduling, in order to integrate charge corresponding to the corrected integration time in the charge storage units CS.

Step S16:

Then, the light source unit 2 emits the light pulses OP according to the predetermined cycle under the control corresponding to the non-operating scheduling performed by the operation control section 434, i.e., according to the integration cycle and emission time (integration time) of the operating light pulse emission condition corresponding to the base integration time.

Under the control corresponding to the non-operating scheduling performed by the operation control section 434, the pixel drive circuit 322 distributes charge generated due to the reflected light RL in the photoelectric conversion element PD to the charge storage units CS1, CS2, CS3, CS4 of each of the pixel circuits 321 for integration therein.

Then, the distance calculation unit 42 calculates a distance according to the charge integrated in each of the charge storage units CS1, CS2, CS3, CS4.

Step S17:

The zone determination section 432 selects a pixel circuit 321 with smallest total charge and a pixel circuit 321 with greatest total charge from the pixel circuits 321 of the range image sensor 32.

Then, the zone determination section 432 compares the smallest total charge with a preset lower limit threshold and compares the greatest total charge with a preset upper limit threshold.

In this case, if the smallest total charge is smaller than the preset lower limit threshold or if the greatest total charge exceeds the preset upper limit threshold, the zone determination section 432 allows processing to proceed to step S11.

If the smallest total charge is smaller than the preset lower limit threshold or if the greatest total charge exceeds the preset upper limit threshold, it means that the object used for measurement zone selection is no longer present in the current measurement zone, and therefore, reference total charge is acquired again according to the reference integration time to change the measurement zone.

Also, if the smallest total charge is equal to or greater than the preset lower limit threshold and if the greatest total charge is equal to or smaller than the preset upper limit threshold, the zone determination section 432 allows processing to proceed to step S16.

If the smallest total charge is equal to or greater than the preset lower limit threshold and if the greatest total charge is equal to or smaller than the preset upper limit threshold, it means that the object used for measurement zone selection is present in the current measurement zone, and therefore, there is no need to change the measurement zone and thus measurement of the measurement distance is continued with the current corrected integration time.

In the present embodiment described above, if a target as the object used for measurement zone selection is not present in the current measurement zone, processing is determined to return to acquiring reference total charge according to the reference integration time; however, if the object is present in the current measurement zone, ranging processing is determined to be continued.

However, if there are only a small number of set measurement zones, such as two or three, and if the smallest total charge is smaller than the present lower limit threshold or if the greatest total charge exceeds the present upper limit threshold, processing does not have to proceed to acquiring reference total charge according to the reference integration time but may be switched to determining the corresponding measurement zone to continue ranging processing.

As described above, according to the present embodiment, reference total charge generated due to the reflected light RL with a highest intensity using the preset reference integration time is compared with the charge thresholds LC1 and LC2, a measurement zone where the object is present (the measurement zone where the object with a highest intensity of reflected light RL is present) is determined based on the comparison result, and an integration time (i.e., corrected integration time) for integrating charge not saturating the charge storage units CS is calculated according to the reflected light RL with a highest intensity. Therefore, the charge storage units CS of all the pixel circuits 321 in the range image sensor 32 can be prevented from being saturated, an integration time can be suitably set so that charge is integrated in the charge storage units CS as much as possible without saturation, and accuracy in distance measurement in auto exposure can be improved in all the pixels of the range image compared to the conventional art.

According to the present embodiment, integration times corresponding to the respective ambient light intensities (external light intensities) are set in the integration time table of each measurement zone, and therefore, an integration time corresponding to the ambient light intensity measured in the light pulse emission condition selection mode can be selected, and this can easily suppress saturation of the charge storage units due to the ambient light intensity.

According to the present embodiment, the base integration time is set as an emission condition satisfying eye-safety standards, according to the emission cycle and the width of light pulses. Therefore, if a distance is measured with the base integration time corresponding to the greatest emission time of the light pulses, i.e., even in the state where pulsed light is continuously emitted without thinning, personal safety standards (eye-safety standards) can be satisfied.

It may be configured such that the integration periods to be targeted for thinning processing of the present embodiment are randomly selected by random or pseudo-random numbers corresponding to the thinning time, from the unit integration periods forming the integration period to thereby perform the non-operating scheduling to indicate the unit integration periods selected as targets for thinning processing.

This can reduce the situation that, if another TOF type range imaging device is operating under the same environment, one of or both of these TOF type range imaging devices may detect the emitted light and/or the reflected light of the other as noise, and the reflected light from the object that should be detected by itself according to the signal-noise (SN) ratio cannot be correctly detected.

The reason why the above processing is performed is that, in the case where multiple TOF type range imaging devices independently emit light and distribute charge generated due to reflected light at independent timing, when charge integration operation corresponding to the integration time of one frame is repeated by each first TOF type range imaging device, emitted light of a second TOF type range imaging device, if it is continuously distributed to specific charge storage units, such as the charge storage units of the first device, may be detected by the first device as a signal because the timing may match between the first and second devices, depending on the setting in which the timing of distribution processing and the timing of emitting light pulses are the same or multiples of each other between these first and second devices.

In the case of TOF type, since charge generated in one distribution processing is small, signal-noise (SN) ratio is improved by increasing the integration time.

Therefore, during repetition corresponding to the integration time, each first TOF type range imaging device has a high probability of detecting emitted light of a second TOF type range imaging device as a signal, if the emission timing is in match between the first and second devices.

In the present method, the individual TOF type range imaging devices randomly perform thinning processing of not integrating charge.

Thus, each first TOF type range imaging device is less likely to integrate the emitted light from a second TOF type range imaging device in the charge storage units of the first device, and signals (reflected light from the object that should be acquired by the first device) are reduced and thus are prevented from being embedded in the emitted light as noise from the second device, or noise is approximately evenly integrated in all the charge storage units of the first device and subtracted from all the signals when removing ambient light, and thus the effect of emitted light from the second device can be reduced.

Furthermore, in the case where each first TOF type range imaging device has a configuration of executing the thinning processing, the probability of the emitted light from a second TOF type range imaging device being integrated in the charge storage units of the first device is further reduced, and this can more effectively reduce the phenomenon in which the reflected light from the object that should be acquired by the first device is embedded in the emitted light as noise from the second device.

A range imaging device using TOF techniques has been described so far as configurations of the first and second embodiments; however, the present invention is not limited to be applied to this, but can be applied to sensors such as RGB-IR (red green blue-infrared radiation) sensors with a structure in which a photodiode is applied as a charge storage unit.

As long as charge generated due to incident light in the photodiode is configured to be integrated in the charge storage units, the present invention can also be applied to CCD (charge coupled device) image sensors, CMOS (complementary metal oxide semiconductor) image sensors, or the like.

In the first and second embodiments described above, a configuration including four pixel signal readouts RU1 to RU4 has been described; however, the configuration should not be limited to this. For example, the configuration may include three pixel signal readouts RU, or include five or more pixel signal readouts RU, i.e., in the configuration including three or more pixel signal readouts RU, processing similar to the present embodiment may be performed by comparing reference total charge generated due to the reflected light RL with a highest intensity using the preset reference integration time, with the charge thresholds LC1 and LC2, calculating a measurement zone where the object is present (the measurement zone where the object with a highest intensity of reflected light RL is present) based on the comparison result, and calculating an integration time (i.e., corrected integration time) for integrating charge not saturating the charge storage units CS according to the reflected light RL with a highest intensity. Thus, the charge storage units CS of all the pixel circuits 321 in the range image sensor 32 can be prevented from being saturated, an integration time can be suitably set so that charge is integrated in the charge storage units CS as much as possible without saturation, and accuracy in distance measurement in auto exposure can be improved in all the pixels of the range image compared to the conventional art.

Also, for the configuration including three or more pixel signal readouts RU, the configuration as in the present embodiment may be provided in which integration times corresponding to the respective ambient light intensities (external light intensities) are set in the integration time table of each measurement zone. Thus, an integration time corresponding to the ambient light intensity measured in the light pulse emission condition selection mode can be selected, and this can easily suppress saturation of the charge storage units due to the ambient light intensity.

Also, for the configuration including three or more pixel signal readouts RU, the configuration as in the present embodiment may be provided in which the base integration time is set as an emission condition satisfying eye-safety standards, according to the emission cycle and the width of light pulses. Thus, if a distance is measured with the base integration time corresponding to the greatest emission time of the light pulses, i.e., even in the state where pulsed light is continuously emitted without thinning, personal safety standards (eye-safety standards) can be satisfied.

The configuration described in the first and second embodiments includes four pixel signal readouts RU1 to RU4, and the pixel signal readout RU1 is dedicated to measurement of ambient light. However, for a configuration including three or more pixel signal readouts RU, none of the pixel signal readouts RU has to be dedicated to ambient light use, but a comparison may be made between the pixel signal readouts RU for the integrated charges, and a pixel signal readout RU with smallest integrated charge may be selected as a pixel signal readout RU for reading ambient light. With this configuration, accuracy in distance measurement in auto exposure can be improved in all the pixels of the range image compared to the conventional art, the charge storage units can be easily prevented from being saturated due to ambient light intensity, and even in the state where pulsed light is continuously emitted without thinning, personal safety standards (eye-safety standards) can be satisfied, by performing processing as in the first and second embodiments.

As described above, according to an embodiment of the present invention, there can be provided a range imaging device and a range imaging method which can determine an integration time for integrating electrical charge required for performing distance measurement with predetermined accuracy, without saturating the charge storage units even when the reflectances of the objects in a measurement space or the distances to the objects from the range imaging device are unknown, and can reduce the effect of light emitted from another range imaging device.

Time of flight (hereinafter referred to as TOF) type range imaging devices measure the distance to an object based on the time of flight of light, using the speed of light (e.g., see JP 2004-294420 A).

Such a TOF type range imaging device includes a light source unit that emits light, and a pixel array in which multiple pixel circuits that detect light for measuring a distance are formed in a two-dimensional matrix (in an array). The pixel circuits each include a photoelectric conversion element (e.g., photodiode) as a component which generates electrical charge corresponding to the intensity of light.

With this configuration, the TOF type range imaging device can acquire information on the distance between itself and the object or can capture an image of the object in a measurement space (three-dimensional space).

The TOF type range imaging device measures a distance based on delay time between the timing of emitting light and the timing of receiving light reflected by the object.

However, the electrical charge generated by the light sensor changes depending on the intensity of incident light, and thus as the distance to the object increases, the intensity of reflected light decreases (light intensity is inversely proportional to the square of the distance).

Since the TOF type range imaging device obtains the delay time based on the electrical charge integrated in charge storage units, the measurement accuracy improves as the signal-to-noise (SN) ratio increases.

Therefore, the exposure time is changed according to the distance to the object from the TOF type range imaging device (hereinafter simply referred to as range imaging device) (auto exposure) (e.g., see JP 2012-185171 A).

Herein, the exposure time refers to the time required for integrating the electrical charge generated by the photoelectric conversion element in the charge storage units according to the intensity of incident light.

Thus, the electrical charge exposure time is increased as the distance to the object increases so that the electrical charge integrated in the charge storage units of the TOF sensor is increased, thereby maintaining distance measurement accuracy.

However, since light intensity is inversely proportional to the distance to the object, if integration time (exposure time) is set in advance to match a distant object while there are objects having different reflectances, the charge storage units may become saturated with electrical charge generated due to the reflected light from an object having high reflectance.

In addition, if the integration time (exposure time) is set to match a distant object in order to improve accuracy in measurement distance while there are objects whose distances from the range imaging device are unknown, if an object is present at a short distance, the charge storage units may become saturated with electrical charge generated due to the reflected light from this short-distance object due to the intensity of the reflected light from this object becoming high, and thus accuracy in distance to be measured cannot be maintained.

Furthermore, as the integration time (exposure time) is increased, light is more frequently emitted, and therefore, if another TOF type range imaging device is operating under the same environment, one of or both of these TOF type range imaging devices may detect the emitted light and/or the reflected light of the other, and thus the reflected light from the object cannot be correctly detected.

A range imaging device and a range imaging method according to embodiments of the present invention determine an integration time for integrating electrical charge required for performing distance measurement with predetermined accuracy, without saturating the charge storage units even when the reflectances of the objects in a measurement space or the distances to the objects from the range imaging device are unknown, and reduce the effect of light emitted from another range imaging device.

A range imaging device according to an embodiment of the present invention includes: a light-receiving unit including at least one pixel circuit including a photoelectric conversion element that generates charge according to incident light incident from a measurement space that is a space targeted for measurement, N (N≥3) charge storage units that integrate the charge in a frame cycle, and transfer transistors that transfer the charge to the charge storage units from the photoelectric conversion element, and a pixel drive circuit that turns on or off the transfer transistors for the charge storage units at predetermined integration timing synchronizing with emission of light pulses to distribute and integrate the charge; a light source unit that emits the light pulses to the measurement space; a range image processing unit that calculates a distance from the light-receiving unit to an object that is present in the measurement space as a measurement distance, based on charge integrated in each of the charge storage units; and a measurement control unit that calculates a thinning time that is the number of times thinning processing is performed in which the charge in the charge storage units is not integrated, in terms of an integration time that is the number of times integration of integrating the charge is performed, according to integrated charge in the charge storage units, the distance, and intensity of the incident light, wherein the measurement control unit determines a measurement zone, to which the measurement distance belongs, from among measurement zones which are established according to zone thresholds that are set according to multiple distances from the light-receiving unit, and controls integration of the charge in the charge storage units according to a thinning time which is set in the measurement zone as determined.

In the range imaging device according to an embodiment of the present invention, the measurement control unit determines the measurement zone in which the measurement distance is included by comparing each of the zone thresholds with the measurement distance which is measured to be nearest in an arbitrary region in which the at least one pixel circuit is formed.

A range imaging device according to an embodiment of the present invention includes: a light-receiving unit including at least one pixel circuit including a photoelectric conversion element that generates charge according to incident light incident from a measurement space that is a space targeted for measurement, N (N≥3) charge storage units that integrate the charge in a frame cycle, and transfer transistors that transfer the charge to the charge storage units from the photoelectric conversion element, and a pixel drive circuit that turns on or off the transfer transistors for the charge storage units at predetermined integration timing synchronizing with emission of light pulses to distribute and integrate the charge; a light source unit that emits the light pulses to the measurement space; a range image processing unit that calculates a distance from the light-receiving unit to an object that is present in the measurement space as a measurement distance, based on charge integrated in each of the charge storage units; and a measurement control unit that calculates a thinning time that is the number of times thinning processing is performed in which the charge in the charge storage units is not integrated, in terms of an integration time that is the number of times integration of integrating the charge is performed, according to integrated charge in the charge storage units, the distance, and intensity of the incident light, wherein the integrated charge is divided by a reference charge as a preset reference integrated charge, and using a charge ratio resulting from the division, a measurement zone, to which the measurement distance belongs, is determined from among measurement zones established according to zone thresholds that are set according to multiple charge ratios, and integration of the charge in the charge storage units is controlled according to a thinning time which is set in the measurement zone as determined.

In the range imaging device according to an embodiment of the present invention, the measurement control unit may determine the measurement zone in which the charge ratio is included by comparing each of the zone thresholds with a highest charge ratio in an arbitrary region in which the at least one pixel circuit is formed.

In the range imaging device according to t an embodiment of the present invention, the measurement control unit may randomly select unit integration periods as targets for thinning processing by a number corresponding to the thinning time from unit integration periods forming an integration period in the charge storage units.

In the range imaging device according to an embodiment of the present invention, ambient light charge that is generated due to ambient light and integrated in the charge storage units may be calculated, and the thinning time may be selected from multiple thinning times in the measurement zone according to the ambient light charge.

In the range imaging device according to an embodiment of the present invention, setting charge generated due to reflected light from an object with a predetermined distance and a predetermined reflectance, as the reference charge, a pulse width of the light pulses, integration time in the charge storage units, and the integration time may be set so that the reference charge does not exceed charge storage capacity of the charge storage units.

In the range imaging device according to an embodiment of the present invention, the reference charge may be calculated as charge generated due to ambient light and reflected light from an object with a predetermined distance and a predetermined reflectance; and as the integrated charge used when calculating the charge ratio, the measurement control unit may use integrated charge in the charge storage units used when calculating the reference charge.

The range imaging device according to an embodiment of the present invention, setting the reference charge for each of a predetermined distance and a predetermined reflectance, the charge ratio may have a correlation with an attenuation rate according to the distance and an attenuation rate according to the reflectance.

In the range imaging device according to an embodiment of the present invention, the measurement control unit may use the integration time selected in the measurement zone during a predetermined period, or may continuously use the integration time until the measurement distance is detected as being within a distance range of a measurement zone which is different from the current measurement zone.

In the range imaging device according to an embodiment of the present invention, the measurement control unit may use the integration time selected in the measurement zone during a predetermined period or may continuously use the integration time until the charge ratio is detected as being within a measurement zone different from the current measurement zone.

In the range imaging device according to an embodiment of the present invention, with the charge being not integrated in the charge storage units in the thinning processing, the light source unit does not have to be permitted to emit the light pulses and the charge does not have to be distributed to the charge storage units.

In the range imaging device according to an embodiment of the present invention, the at least one pixel circuit may include a charge discharge circuit that discharges the charge generated in the photoelectric conversion element other than in a charge integration period of the charge storage units.

A range imaging method according to an embodiment of the present invention controls a range imaging device including at least one pixel circuit, a light source unit, a pixel drive circuit, a range image processing unit, and a measurement control unit, the at least one pixel circuit including a photoelectric conversion element, multiple charge storage units, and transfer transistors, the method including steps of: emitting light pulses in a measurement space that is a space targeted for measurement, as performed by the light source unit; turning on or off the transfer transistors that transfer charge to N (N≥3) charge storage units from the photoelectric conversion element, the charge being generated by the photoelectric conversion element at predetermined timing synchronizing with emission of the light pulses, according to incident light incident from the measurement space, as performed by the pixel drive circuit; calculating a distance from the range imaging device to an object present in the measurement space as a measurement distance, based on charge integrated in each of the charge storage units, as performed by the range image processing unit; and when calculating a thinning time in terms of an integration time according to integrated charge in the charge storage units, the distance, and intensity of the incident light, determining a measurement zone, to which the measurement distance belongs, from among measurement zones established according to zone thresholds that are set according to multiple distances from the range imaging device, and controlling integration of the charge in the charge storage units according a thinning time which is set in the measurement zone as determined, the thinning time being the number of times thinning processing is performed in which the charge in the charge storage units is not integrated, the integration time being the number of times integration of integrating the charge is performed, as performed by the measurement control unit.

A range imaging method according to an embodiment of the present invention controls a range imaging device including at least one pixel circuit, a light source unit, a pixel drive circuit, a range image processing unit, and a measurement control unit, the at least one pixel circuit including a photoelectric conversion element, multiple charge storage units, and transfer transistors, the method including steps of: emitting light pulses in a measurement space that is a space targeted for measurement, as performed by the light source unit; turning on or off the transfer transistors that transfer charge to N (N≥3) charge storage units from the photoelectric conversion element, the charge being generated by the photoelectric conversion element at predetermined timing synchronizing with emission of the light pulses, according to incident light incident from the measurement space, as performed by the pixel drive circuit; calculating a distance from the range imaging device to an object present in the measurement space as a measurement distance, based on charge integrated in each of the charge storage units, as performed by the range image processing unit; and when calculating a thinning time in terms of an integration time according to integrated charge in the charge storage units, the distance, and intensity of the incident light, dividing the integrated charge by reference charge as preset reference integrated charge and, using a charge ratio resulting from the division, determining a measurement zone, to which the measurement distance belongs, from among measurement zones established according to zone thresholds that are set according to multiple charge ratios, and controlling integration of the charge in the charge storage units according a thinning time which is set in the measurement zone as determined, the thinning time being the number of times thinning processing is performed in which the charge in the charge storage units is not integrated, the integration time being the number of times integration of integrating the charge is performed, as performed by the measurement control unit.

As described above, a range imaging device and a range imaging method according to embodiments of the present invention determine an integration time for integrating electrical charge required for performing distance measurement with predetermined accuracy, without saturating the charge storage units even when the reflectances of the objects in a measurement space or the distances to the objects from the range imaging device are unknown, and reduce the effect of light emitted from another range imaging device.

Obviously, numerous modifications and variations of the present invention are possible in light of the above teachings. It is therefore to be understood that within the scope of the appended claims, the invention may be practiced otherwise than as specifically described herein.

The invention claimed is:

1. A method for controlling a range imaging device, comprising:

emitting light pulses in a measurement space targeted for measurement by a light source of the range imaging device;

turning on or off a plurality of transfer transistors configured to transfer charge to a plurality of charge storage units of the range imaging device from a photoelectric conversion element of the range imaging device;

calculating, based on charge integrated in each of the charge storage units, a distance from the range imaging device to an object in the measurement space as a measurement distance; and calculating a thinning time in terms of an integration time according to integrated charge in the charge storage units, the distance, and intensity of incident light, wherein the range imaging device includes a pixel drive circuit configured to turn on or off the transfer transistors for the charge storage units at the predetermined integration timing synchronizing with the emission of the light pulses to distribute and integrate the charge, a range image processing unit comprising circuitry configured to calculate, based on the charge integrated in each of the charge storage units, the distance from the range imaging device to the object in the measurement space as the measurement distance, and the measurement control unit comprising circuitry configured to calculate the thinning time in terms of the integration time according to integrated charge in the charge storage units, the distance, and the intensity of the incident light, the calculating the thinning time includes determining a measurement zone, to which the measurement distance belongs, from among measurement zones established according to zone thresholds set according to multiple distances from the range imaging device, and controlling integration of the charge in the charge storage units according the thinning time set in the measurement zone as determined, the thinning time is a number of times thinning processing is performed in which the charge in the charge storage units is not integrated, and the integration time is a number of times integration of integrating the charge is performed.

2. A range imaging device, comprising a light source configured to emit light pulses to a measurement space;

a light-receiving unit including a pixel drive circuit and at least one pixel circuit including a photoelectric conversion element, a plurality of charge storage units, and a plurality of transfer transistors;

a range image processing unit comprising circuitry configured to calculate, based on charge integrated in each of the charge storage units, a distance from the light-receiving unit to an object in the measurement space as a measurement distance; and a measurement control unit comprising circuitry configured to calculate a thinning time according to integrated charge in the charge storage units, the distance, and intensity of incident light, wherein the photoelectric conversion element generates the charge according to the incident light incident from the measurement space targeted for measurement, the plurality of charge storage units has N charge storage units where N≥3 and integrates the charge in a frame cycle, the plurality of transfer transistors is configured to transfer the charge to the charge storage units from the photoelectric conversion element, the pixel drive circuit is configured to turn on or off the transfer transistors for the charge storage units at predetermined integration timing synchronizing with emission of light pulses to distribute and integrate the charge, the thinning time is a number of times thinning processing is performed in which the charge in the charge storage units is not integrated, in terms of an integration time that is a number of times integration of integrating the charge is performed, and the circuitry of the measurement control unit is configured to determine a measurement zone, to which the measurement distance belongs, from among measurement zones which are established according to zone thresholds set according to multiple distances from the light-receiving unit, and control integration of the charge in the charge storage units according to the thinning time set in the measurement zone as determined.

3. The range imaging device according to claim 2, wherein the measurement control unit determines the measurement zone in which the measurement distance is included by comparing each of the zone thresholds with the measurement distance which is measured to be nearest in an arbitrary region in which the at least one pixel circuit is formed.

4. The range imaging device according to claim 3, wherein the measurement control unit randomly selects unit integration periods as targets for thinning processing by a number corresponding to the thinning time from unit integration periods forming an integration period in the charge storage units.

5. The range imaging device according to claim 3, wherein ambient light charge that is generated due to ambient light and integrated in the charge storage units is calculated, and the thinning time is selected from multiple thinning times in the measurement zone according to the ambient light charge.

6. The range imaging device according to claim 3, wherein the measurement control unit uses the integration time selected in the measurement zone during a predetermined period, or continuously uses the integration time until the measurement distance is detected as being within a distance range of a measurement zone which is different from the current measurement zone.

7. The range imaging device according to claim 2, wherein the measurement control unit randomly selects unit integration periods as targets for thinning processing by a number corresponding to the thinning time from unit integration periods forming an integration period in the charge storage units.

8. The range imaging device according to claim 2, wherein ambient light charge that is generated due to ambient light and integrated in the charge storage units is calculated, and the thinning time is selected from multiple thinning times in the measurement zone according to the ambient light charge.

9. The range imaging device according to claim 2, wherein the measurement control unit uses the integration time selected in the measurement zone during a predetermined period, or continuously uses the integration time until the measurement distance is detected as being within a distance range of a measurement zone which is different from the current measurement zone.

10. The range imaging device according to claim 2, wherein with the charge being not integrated in the charge storage units in the thinning processing, the light source unit is not permitted to emit the light pulses and the charge is not distributed to the charge storage units.

11. The range imaging device according to claim 2, wherein the at least one pixel circuit includes a charge discharge circuit that discharges the charge generated in the photoelectric conversion element other than in a charge integration period of the charge storage units.

12. A method for controlling a range imaging device, comprising:

emitting light pulses in a measurement space targeted for measurement by a light source of the range imaging device;

turning on or off a plurality of transfer transistors configured to transfer charge to a plurality of charge storage units of the range imaging device from a photoelectric conversion element of the range imaging device;

calculating, based on charge integrated in each of the charge storage units, a distance from the range imaging device to an object in the measurement space as a measurement distance; and calculating a thinning time in terms of an integration time according to integrated charge in the charge storage units, the distance, and intensity of incident light, wherein the range imaging device includes a pixel drive circuit configured to turn on or off the transfer transistors for the charge storage units at the predetermined integration timing synchronizing with the emission of the light pulses to distribute and integrate the charge, a range image processing unit comprising circuitry configured to calculate, based on the charge integrated in each of the charge storage units, the distance from the range imaging device to the object in the measurement space as the measurement distance, and the measurement control unit comprising circuitry configured to calculate the thinning time in terms of the integration time according to integrated charge in the charge storage units, the distance, and the intensity of the incident light, the calculating the thinning time includes dividing the integrated charge by reference charge as preset reference integrated charge and, using a charge ratio resulting from the division, determining a measurement zone, to which the measurement distance belongs, from among measurement zones established according to zone thresholds set according to multiple charge ratios, and controlling integration of the charge in the charge storage units according the thinning time set in the measurement zone as determined, the thinning time is a number of times thinning processing is performed in which the charge in the charge storage units is not integrated, and the integration time is a number of times integration of integrating the charge is performed, as performed by the measurement control unit.

13. A range imaging device, comprising a light source configured to emit light pulses to a measurement space;

a light-receiving unit including a pixel drive circuit and at least one pixel circuit including a photoelectric conversion element, a plurality of charge storage units, and a plurality of transfer transistors;

a range image processing unit comprising circuitry configured to calculate, based on charge integrated in each of the charge storage units, a distance from the light-receiving unit to an object in the measurement space as a measurement distance; and a measurement control unit comprising circuitry configured to calculate a thinning time according to integrated charge in the charge storage units, the distance, and intensity of incident light, wherein the photoelectric conversion element generates the charge according to the incident light incident from the measurement space targeted for measurement, the plurality of charge storage units is N charge storage units where N≥3 and integrates the charge in a frame cycle, the plurality of transfer transistors is configured to transfer the charge to the charge storage units from the photoelectric conversion element, the pixel drive circuit is configured to turn on or off the transfer transistors for the charge storage units at predetermined integration timing synchronizing with emission of light pulses to distribute and integrate the charge, the thinning time is a number of times thinning processing is performed in which the charge in the charge storage units is not integrated, in terms of an integration time that is a number of times integration of integrating the charge is performed, the integrated charge is divided by a reference charge as a preset reference integrated charge, and using a charge ratio resulting from the division, a measurement zone, to which the measurement distance belongs, is determined from among measurement zones established according to zone thresholds set according to multiple charge ratios, and integration of the charge in the charge storage units is controlled according to the thinning time set in the measurement zone as determined.

14. The range imaging device according to claim 13, wherein the measurement control unit determines the measurement zone in which the charge ratio is included by comparing each of the zone thresholds with a highest charge ratio in an arbitrary region in which the at least one pixel circuit is formed.

15. The range imaging device according to claim 14, wherein setting charge generated due to reflected light from an object with a predetermined distance and a predetermined reflectance, as the reference charge, a pulse width of the light pulses, integration time in the charge storage units, and the integration time are set so that the reference charge does not exceed charge storage capacity of the charge storage units.

16. The range imaging device according to claim 14, wherein the reference charge is calculated as charge generated due to ambient light and reflected light from an object with a predetermined distance and a predetermined reflectance, and as the integrated charge used when calculating the charge ratio, the measurement control unit uses integrated charge in the charge storage units used when calculating the reference charge.

17. The range imaging device according to claim 14, wherein setting the reference charge for each of a predetermined distance and a predetermined reflectance, the charge ratio has a correlation with an attenuation rate according to the distance and an attenuation rate according to the reflectance.

18. The range imaging device according to claim 13, wherein setting charge generated due to reflected light from an object with a predetermined distance and a predetermined reflectance, as the reference charge, a pulse width of the light pulses, integration time in the charge storage units, and the integration time are set so that the reference charge does not exceed charge storage capacity of the charge storage units.

19. The range imaging device according to claim 13, wherein the reference charge is calculated as charge generated due to ambient light and reflected light from an object with a predetermined distance and a predetermined reflectance, and as the integrated charge used when calculating the charge ratio, the measurement control unit uses integrated charge in the charge storage units used when calculating the reference charge.

20. The range imaging device according to claim 13, wherein setting the reference charge for each of a predetermined distance and a predetermined reflectance, the charge ratio has a correlation with an attenuation rate according to the distance and an attenuation rate according to the reflectance.

21. The range imaging device according to claim 13, wherein the measurement control unit uses the integration time selected in the measurement zone during a predetermined period, or continuously uses the integration time until the charge ratio is detected as being in a measurement zone different from the current measurement zone.

* * * * *